US012123659B2

(12) United States Patent
Keolian et al.

(10) Patent No.: US 12,123,659 B2
(45) Date of Patent: Oct. 22, 2024

(54) MONOCOQUE SHELL AND TUBE HEAT EXCHANGER

(71) Applicant: The Penn State Research Foundation, University Park, PA (US)

(72) Inventors: Robert M. Keolian, State College, PA (US); Kevin J. Bastyr, Franklin, MI (US); Ray Scott Wakeland, Marlborough, MA (US); John Feurman Brady, Madison, AL (US)

(73) Assignee: The Penn State Research Foundation, University Park, PA (US)

( * ) Notice: Subject to any disclaimer, the term of this patent is extended or adjusted under 35 U.S.C. 154(b) by 0 days.

(21) Appl. No.: 18/077,939

(22) Filed: Dec. 8, 2022

(65) Prior Publication Data

US 2023/0108485 A1 Apr. 6, 2023

Related U.S. Application Data

(63) Continuation of application No. 16/965,057, filed as application No. PCT/US2019/015832 on Jan. 30, 2019, now Pat. No. 11,525,633.

(Continued)

(51) Int. Cl.

*F28D 7/16* (2006.01)
*F02G 1/055* (2006.01)

(Continued)

(52) U.S. Cl.

CPC .............. *F28D 7/163* (2013.01); *F28F 1/025* (2013.01); *F28F 1/44* (2013.01); *F28F 13/003* (2013.01);

(Continued)

(58) Field of Classification Search

CPC .. F28D 7/163; F28D 2021/0026; F28F 1/025; F28F 13/003; F02G 1/055

(Continued)

(56) References Cited

U.S. PATENT DOCUMENTS 997,610 A 7/1911 Feldkam
1,346,577 A * 7/1920 Whitbeck .............. F28F 13/08 165/44

(Continued)

FOREIGN PATENT DOCUMENTS

CN 104949563 A 9/2015

OTHER PUBLICATIONS

International Search Report dated Mar. 27, 2019; International Application PCT/US2019/015832.

*Primary Examiner* — Jon T. Schermerhorn, Jr.
(74) *Attorney, Agent, or Firm* — DINSMORE & SHOHL LLP

(57) ABSTRACT

A heat exchanger with a monocoque structure transfers heat between a first fluid and a second fluid. The heat exchanger has a plurality of tubes through which the first fluid may flow in a direction, each of the plurality of tubes has a first mouth end, an opposing second mouth end and a waist region between the first mouth end and the second mouth end. The heat exchanger also has one or more intercom1ected fluid challllels through which the second fluid may flow. the one or more fluid chamlels lay generally in a plane, the plurality of tubes and the one or more fluid channels interleave such that heat may be transferred between the plurality of tubes and the one or more fluid challllels, and the direction of flow of the first fluid is generally perpendicular to the plane of the one or more fluid chamlels.

22 Claims, 23 Drawing Sheets

Related U.S. Application Data

(60) Provisional application No. 62/624,170, filed on Jan. 31, 2018.

(51) Int. Cl.
*F28D 21/00* (2006.01)
*F28F 1/02* (2006.01)
*F28F 1/44* (2006.01)
*F28F 13/00* (2006.01)

(52) U.S. Cl.
CPC ...... *F02G 1/055* (2013.01); *F28D 2021/0026* (2013.01)

(58) Field of Classification Search
USPC ............................................................ 60/517
See application file for complete search history.

(56) References Cited

U.S. PATENT DOCUMENTS

| | | | | |
|---|---|---|---|---|
| 1,713,020 A | | 5/1929 | Bowne | |
| 1,995,768 A | | 3/1935 | Fesenmaier | |
| 2,466,684 A | * | 4/1949 | Case | F28F 1/006 165/172 |
| 2,474,467 A | * | 6/1949 | Conley | F24H 3/065 165/122 |
| 2,540,280 A | | 2/1951 | Norman | |
| 2,919,118 A | * | 12/1959 | Hunter | F28D 13/00 165/174 |
| 3,364,548 A | | 1/1968 | Marco | |
| 3,409,075 A | * | 11/1968 | Long | F28F 13/003 165/81 |
| 4,727,935 A | | 3/1988 | Lapeyre | |
| 4,807,342 A | | 2/1989 | Lapeyre | |
| 4,815,533 A | * | 3/1989 | Harada | F28D 7/16 165/165 |
| 2,325,036 A | * | 10/1989 | Case | F28F 1/006 165/172 |
| 4,871,623 A | * | 10/1989 | Hoopman | F28F 13/18 65/168 |
| 4,938,280 A | | 7/1990 | Clark | |
| 5,199,487 A | | 4/1993 | DiFrancesco et al. | |
| 5,317,805 A | | 6/1994 | Hoopman et al. | |
| 5,794,456 A | * | 8/1998 | Ishiguro | F25B 15/008 62/476 |
| 6,415,860 B1 | | 7/2002 | Kelly et al. | |
| 6,892,802 B2 | | 5/2005 | Kelly et al. | |
| 7,908,856 B2 | | 3/2011 | Backhaus et al. | |
| 8,267,163 B2 | | 9/2012 | Stewart | |
| 9,243,851 B2 | | 1/2016 | Viswanathan et al. | |
| 2002/0179291 A1 | | 12/2002 | Abate et al. | |
| 2008/0092587 A1 | * | 4/2008 | Gorbounov | F25B 41/39 165/104.21 |
| 2008/0099191 A1 | * | 5/2008 | Taras | F28F 9/028 165/174 |
| 2009/0314475 A1 | | 12/2009 | Jeon et al. | |
| 2013/0075070 A1 | | 3/2013 | Home | |
| 2014/0250920 A1 | | 9/2014 | Xu et al. | |
| 2014/0338874 A1 | | 11/2014 | Jindou et al. | |
| 2015/0101334 A1 | | 4/2015 | Bond et al. | |
| 2016/0054069 A1 | | 2/2016 | Armsden et al. | |

* cited by examiner

Prior Art

MONOCOQUE SHELL AND TUBE HEAT EXCHANGER

CROSS-REFERENCE TO RELATED APPLICATIONS

This application is a Continuation of application Ser. No. 16,965,057, filed Jul. 27, 2020, which claims the benefit of U.S. PCT Application No. PCT/US2019/015832, filed Jan. 30, 2019, which claims the benefit of U.S. Provisional Application No. 62/624,170, filed Jan. 31, 2018, each of which are hereby incorporated by reference in its entirety.

GOVERNMENT FUNDING

This invention was made with government support under Grant No. N00014-98-1-0212 and N00014-03-1-0652, awarded by the Office of Naval Research and under Grant No. DE-FC26-04NT42113 and DE-AR0000130, awarded by the Department of Energy. The Government has certain rights in the invention.

FIELD OF THE INVENTION

The present invention relates to heat exchangers and more particularly to a shell and tube heat exchanger that may be used in a thermoacoustic or Stirling machine, or other application.

BACKGROUND OF THE INVENTION

Known methods of construction of heat exchangers include plating a thin one-piece layer of metal on top of a sacrificial mandrel containing multiple holes using electroplating (also known as electroforming or electro-deposition) or by using electroless plating (also known as electrode-less deposition). Some relevant U.S. Pat. Nos. are 6,892,802; 5,317,805; 5,199,487; and 4,807,342—but the basic idea goes back to the year 1911 as evident in U.S. Pat. No. 997,610.

FIG. 1 of the prior art, U.S. Pat. No. 6,892,802, shows a three-dimensional view of a cross-flow heat exchanger fabricated using an electrode-less deposition technique. The fabrication does not require the initial formation of two separate halves, bonding those halves together, or alignment of separate parts. After the mandrel is removed, a thin shell, tube-sheet, and tube bundle monocoque structure remains. The tube-sheet is a flat portion of the monocoque structure that is intersected by the ends of the tubes at the top and bottom of the figure. The "shell" of the equivalent conventional shell and tube heat exchanger is the flat side walls at the left and right of FIG. 1 and any header (not shown) that would be placed at the front and back of the figure to inject and collect the secondary heat transfer fluid. In a thermoacoustic or Stirling machine application, the working fluid would be oscillating inside the tube portions, marked "Gas" in FIG. 1, and the secondary heat transfer fluid would flow past the outside of the tube portions, within the shell and tube-sheet portions, marked "Liquid" in FIG. 1.

Following are the six main loss mechanisms of heat exchangers that may lead to lower efficiency of thermoacoustic or Stirling machines: (1) Insufficient net heat transfer between a face of the regenerator and its nearest heat exchanger; (2) Oscillatory heat exchange between the working fluid and the heat exchanger to the extent that it is not isothermal; (3) Flow losses due to the oscillatory motion of the working fluid through the heat exchanger; (4) Joining loss due to an abrupt change from near adiabatic conditions in the working fluid away from the thermal core to non-adiabatic thermal conditions at the heat exchanger; (5) Pressure drop loss of the secondary heat transfer fluid flowing through the heat exchanger; and (6) Poor heat transfer between the secondary heat transfer fluid and the heat exchanger. It is desirable to minimize these losses in the heat exchangers.

Some thermoacoustic and Stirling type machines may suffer from an additional loss mechanism known as Gedeon streaming, i.e. a steady flow of working fluid around the toroidal topology of such machines [see G. W. Swift, *Thermoacoustics: A unifying perspective for some engines and refrigerators*, pp. 177-183, Acoustical Society of America, Melville, NY, 2002; D. Gedeon, "DC gas flows in Stirling and pulse tube cryocoolers," in R. G. Ross, ed., *Cryocoolers* 9, pp. 385-392, Plenum, New York, 1997; and U.S. Pat. No. 6,032,464]. It is desirable to minimize the loss due to Gedeon streaming. The working fluid in thermoacoustic or Stirling machines is often pressurized. It is desirable that the heat exchangers be able to resist high external pressure. The power density of thermoacoustic and Stirling machines is often limited by the amount of heat that can be efficiently transferred through its heat exchangers. It is desirable to increase the effectiveness of heat transfer in thermoacoustic and Stirling heat exchangers and also to fabricate the heat exchangers inexpensively. Thus, there is a need to overcome the limitations of the existing heat exchangers and provide a better solution.

SUMMARY OF THE INVENTION

The thermal core of a thermoacoustic or Stirling machine (or some other similar machines, such as pulse-tube or Vuilleumier types) usually consists of a planar regenerator with two planar heat exchangers placed closely adjacent to each face of the regenerator. The working fluid, which may be helium gas, air or other gas, is free to move in the axial, or "acoustic," direction perpendicular to the generally planar faces of the regenerator and heat exchangers through the pores of the regenerator and passages in the heat exchanger. The working fluid goes through a cycle of compression, translation along the acoustic direction, expansion, and translation back in the acoustic direction. This cycle is known as the Stirling cycle and is equivalent to the fluid motion in a traveling wave of sound.

The hydraulic radius of the regenerator, a measure of its pore size, is usually made smaller than or equal to the so-called thermal penetration depth, $\delta_\kappa=\sqrt{2\kappa/(\rho c_p\omega)}$, where $\kappa$ is the thermal conductivity, $\rho$ is the density, $c_p$ is the heat capacity of the working fluid at constant pressure, and $\omega$ is the angular frequency of the cycle. The thermal penetration depth is about the distance that heat can diffuse through the working fluid in a fraction of the acoustic period. It can be quite small, on the order of 100 microns.

Oscillatory, bi-directional, and zero-average heat may be exchanged between the working fluid and the regenerator during the acoustic cycle. The small pore size of the regenerator may be used as it may allow the above-discussed heat to be transferred almost isothermally. No entropy is produced in the limit of isothermal heat transfer, which leads to higher efficiency in the thermoacoustic or Stirling machine. A thermoacoustic stack, which is a variation of the regenerator, may be used in standing-wave type thermoacoustic machines with the pore size equal to or slightly larger than the thermal penetration depth. A thermoacoustic stack may be considered functionally equivalent to a regenerator.

The purpose of the heat exchangers is to bring net, steady, average, and non-oscillatory heat to or from the faces of the regenerator. This may allow the thermoacoustic or Stirling machine to perform functions, such as refrigeration or the production of work, in the form of sound, from heat. Net heat can be brought into or away from the regenerator via secondary heat transfer fluids—such as water-glycol mixture, alcohol, brine, oil, external air, combustion product, or other fluid. The secondary heat transfer fluid may be placed into close proximity to the working fluid within the heat exchangers.

A monocoque plating-over-mandrel technique allows inexpensive construction of a shell and tube heat exchanger for a thermoacoustic and Stirling machine with tens of thousands of millimeter scale tubes, without having to cut, handle, and join so many small parts. Small tubes lead to higher efficiencies in the thermoacoustic and Stirling machines because of the small size of the thermal penetration depth. Other fabrication methods may also be advantageously employed. Additive manufacturing (also known as 3-D printing), for example, provides another method for monocoque fabrication of a shell-and-tube heat exchanger with tens of thousands of tubes without handling individual small parts.

It is desirable to have large net heat transfer between the regenerator and the heat exchanger. One may achieve this and an almost isothermal oscillatory heat exchange by using a heat exchanger having the working-fluid features that are very small and which may scale with the thermal penetration depth. The monocoque plating-on-mandrel technique or other technique may allow an economical and practical way of accomplishing this in a shell-and-tube geometry. Instead of cutting, arranging, and joining tens of thousands of very small tubes for each heat exchanger, casting mandrels in a mold with many tiny pins that become holes in the mandrel allows the relatively high one-time cost of making the mold to be spread over many mandrels and/or heat exchangers.

Casting the mandrel in a mold with non-cylindrical pin shapes additionally allows for tube shapes that are better suited to thermoacoustic and Stirling machines than the cylindrical tubes of the prior art. Additional advantages, objects, and features of the invention will be set forth in part in the description that follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 2:
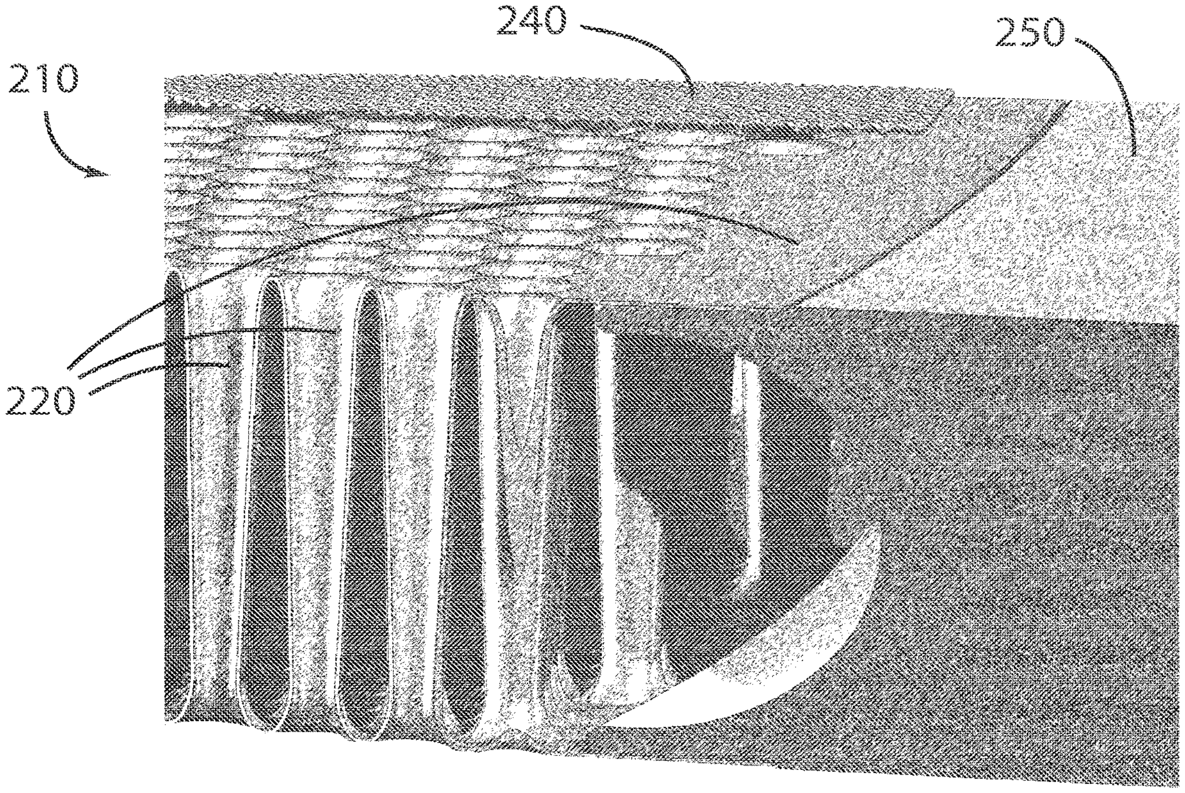
FIG. 2 is a cutaway detail of an embodiment of a shell and tube heat exchanger according to the present invention.

FIG. 2 shows a perspective cutaway detail of an embodiment of a shell and tube heat exchanger 210 that has been optimized according to the present invention for use in thermoacoustic and Stirling machines. The heat exchanger may be asymmetric across its mid-plane. The bottom face in FIG. 2 is the side that may be placed against or near the regenerator. The top face may be away from the regenerator and may define the boundary of the thermal core. Outside the thermal core may be an open duct of working fluid. The three parts shown in FIG. 2 are a portion of a header 250 on the right, a portion of a mesh/screen 240 at the top, and a portion of a monocoque tube bundle 220 at the center left.

Figure 3:
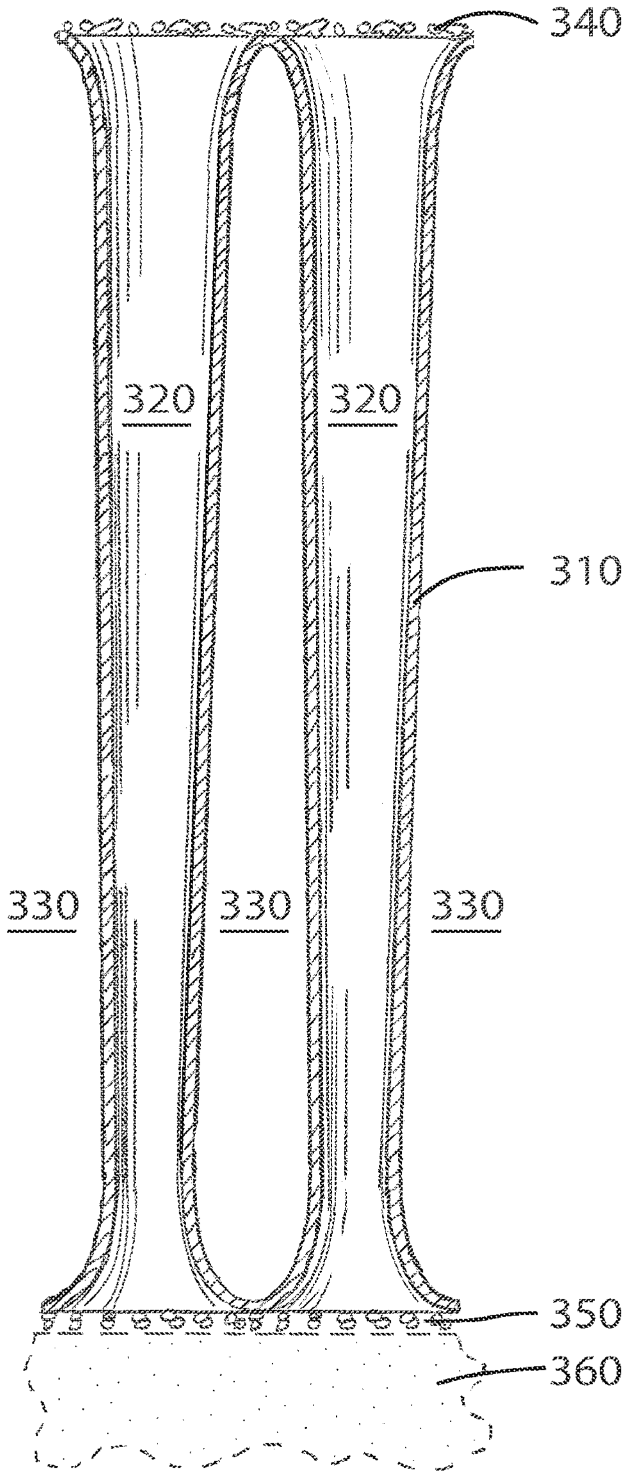
FIG. 3 is a cutaway detail of two tubes of a shell and tube heat exchanger according to the present invention.

Another mesh/screen (not shown in FIG. 2) may also be joined to the bottom face of the monocoque tube bundle and placed against or near the regenerator, as shown in cutaway detail in FIG. 3. In FIG. 3, the working fluid/first fluid flows in the working fluid space 320 inside the tubes of monocoque structure 310, and secondary heat transfer fluid/second fluid circulates around the tubes in the secondary heat transfer fluid space 330. A mesh/screen or similar porous planar structure 340 is joined to the monocoque structure on the face away from the regenerator 360, and another mesh/screen or similar porous planar structure 350 is joined to the monocoque structure on the face adjacent to the regenerator. The planar structures according to various embodiments of this invention do not have to be strictly planar, and include generally planar structures. For example, mesh/screen 340 may have a porous planar or generally planar structure. According to one embodiment, the length of the tubes may be about 15 mm or less. If the secondary heat exchange fluid is a gas, the length of the tubes may be more than 15 mm. The tubes are nominally circular in cross-section, but deviations from a circular cross-section may be acceptable as well.

Figure 1:
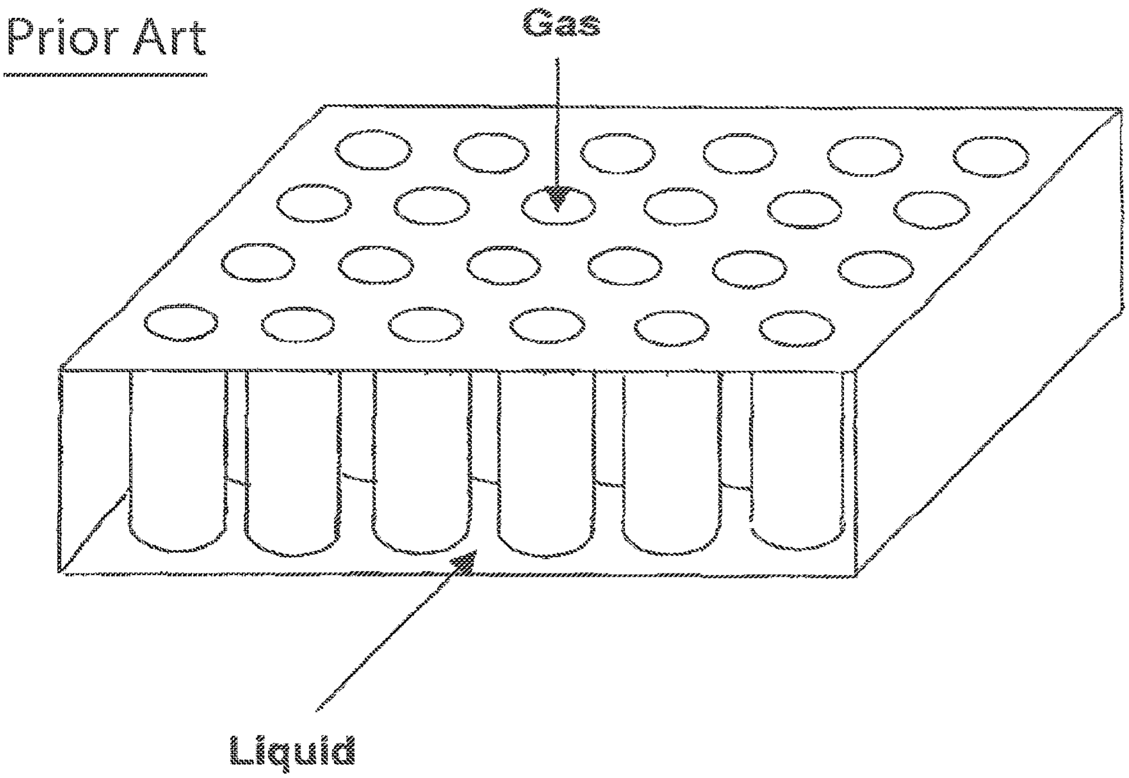
FIG. 1 is a three dimensional view of a prior art cross-flow heat exchanger fabricated using an electrode-less deposition technique.

There may be several improvements associated with embodiments of this design. Not all improvements discussed herein apply to all embodiments and the herein discussed improvements should not be considered as limitations on any embodiments. First, the tubes of the monocoque tube bundle may be tapered at both ends of each tube portion with each tube having mouths at each end that are wider in cross section than the cross section of the tube waist region between the two mouths in the manner of an hourglass or Venturi tube. The cross section of the tubes of the monocoque bundle varies between the respective two mouths and the region that has the narrowest cross section is defined as the tube waist region. In some embodiments, the tube waist region lies near the middle of the tube, while in other embodiments, the tube waist region lies toward either of the two mouths of the respective tube. In some embodiments, the tube waist region is disposed at a distance of about 10% to 40% of the tube length from the first mouth end or the second mouth end. In other embodiments, the tube waist region is disposed at a distance of about 7% to 92% of the tube length from the first mouth end or the second mouth end. The adjacent mouth ends may be smoothly blended together such that the smoothly blended surface between adjacent mouth ends may have a continuous curved surface. In some embodiments, the blended surface may have sections of circles, parabolas, ellipses or other smooth curves. In other embodiments, the blended surface is curved and without abrupt steps or transitions. In some other embodiments, the blended surface may have a sharp change of slope near the boundaries of adjacent mouth ends. In other embodiments there may be a small raised boss near the boundaries of the adjacent mouth ends. These embodiment may have the following advantages: (1) The near elimination of the flat tube-sheet portion of the monocoque of FIG. 1, making the structure stronger against external or internal mean pressure; (2) Greater utilization of the regenerator by minimization of regenerator occlusion by the heat exchanger; (3) More space for the secondary heat transfer fluid at the narrow waist region of the tubes, thus decreasing pressure drop losses of the secondary heat transfer fluid; (4) Better heat transfer to the working fluid at the narrow waist region of the tubes; (5) A smooth streamlined blending of working fluid flow as the working fluid enters the heat exchanger from either face, thus decreasing or eliminating working fluid flow losses that may be caused by the formation of a vena contracta; (6) Decrease or elimination of jetting of the working fluid as it flows away from the regenerator and exits the heat exchanger into the open duct outside the thermal core, thus decreasing or eliminating jetting pressure drop losses, and facilitating the flow in the open duct outside the thermal core to be more laminar and thus give the working fluid a second chance to exchange heat with the heat exchanger as it reenters the heat exchanger on the other half of the acoustic cycle; and (7) Easier separation of the cast sacrificial mandrel from its mold by allowing for a draft angle on the pins of a mold that separates into two pieces at the plane that passes through the narrowest part of the waist region of the tubes, should the heat exchanger be fabricated with a plating-on-cast-mandrel method.

Another improvement is that the narrowest part of the tube waist region is closer to the regenerator facing face of the heat exchanger than the face away from the regenerator. This embodiment may also have an advantage of having a smaller angle taper of the tubes on the side away from the regenerator to minimize the flow separation of working fluid from the tube walls and thus minimizing jetting into the open duct space outside the thermal core. This decreases or eliminates the jetting pressure drop losses and facilitates the flow in the open duct outside the thermal core to be more laminar, thus giving the working fluid a second chance to exchange heat with the heat exchanger as it reenters the heat exchanger on the other half of the acoustic cycle.

Furthermore, another improvement associated with this design is that a mesh/screen or similar porous planar structure (e.g. one or more sheets of woven wire mesh, perforated or chemically etched sheet, expanded metal, sintered powder, felt, open-cell foam, or additively manufactured porous structure), with pore size finer than the tube mouth hydraulic radius, is joined to the monocoque tube bundle on the face away from the regenerator. The mesh/screen or similar porous structure has minute openings or constrictions of complicated three dimensional shape through which working fluid may pass. According to the present invention, fluid may pass through the mesh/screen or porous structure and the dimension of the opening or constriction corresponds to the pore size. As discussed above, the joining of the mesh/screen or similar porous structure to the monocoque tube bundle may have the following advantages: (1) A further decrease of jetting of the working fluid as it flows away from the regenerator and exits the heat exchanger into the open duct space outside the thermal core helps the flow in the open duct outside the thermal core to be more laminar and thus gives the working fluid a second chance to exchange heat with the heat exchanger as it reenters the heat exchanger on the other half of the acoustic cycle; and (2) Additional heat exchange with the working fluid via the mesh/screen and the thermal conduction path of the mesh/screen, the means for joining of the mesh/screen to the monocoque tube bundle, and the monocoque tube bundle to the secondary heat transfer fluid.

Moreover, another improvement associated with this design is that a mesh/screen or similar porous planar structure (e.g. one or more sheets of woven wire mesh, perforated or chemically etched sheet, expanded metal, sintered powder, felt, open-cell foam, or additively manufactured porous structure), with pore size finer than the tube mouth hydraulic radius, is joined to the monocoque tube bundle on the face adjacent to the regenerator. This may have an advantage of an additional heat exchange with the working fluid via the mesh/screen and the thermal conduction path of the mesh/screen to the monocoque tube bundle. The mesh/screen may be acting as the initial portion of the regenerator and thus may put the regenerator into direct thermal contact with the secondary heat transfer fluid via the thermal conduction path of the lateral and axial thermal conductivity of the mesh/screen over each tube mouth, the thermal conduction of the means for joining of the mesh/screen to the monocoque tube bundle, and the thermal conduction of the monocoque tube bundle to the secondary heat transfer fluid.

Yet another improvement associated with this design is that porous packing (e.g. open-cell metal foam, sintered powder, felt, additively manufactured porous structure, or one or more segments of woven wire mesh, perforated or chemically etched sheet, or expanded metal), with pore size finer than the tube hydraulic radius, are joined within the tubes to the monocoque tube bundle. The porous packing may fully or partially fill the tubes. This may have the following advantages: (1) Additional heat exchange with the working fluid via the porous packing and the thermal conduction path of the porous packing, the means for joining of the porous packing to the monocoque tube bundle, and the monocoque tube bundle to the secondary heat transfer fluid; (2) Reduction, through more isothermal contact of the working fluid with the heat exchanger, of losses due to non-isothermal oscillating heat exchange; (3) A further decrease of jetting of the working fluid as it flows away from the regenerator and exits the heat exchanger into the open duct space outside the thermal core, which helps the flow in the open duct outside the thermal core to be more laminar and thus gives the working fluid a second chance to exchange heat with the heat exchanger as it reenters the heat exchanger on the other half of the acoustic cycle; and (4) If it is placed against the regenerator, the porous packing may be acting as the initial portion of the regenerator and thus may put the regenerator into direct thermal contact with the secondary heat transfer fluid via the thermal conduction path of the lateral and axial thermal conductivity of the porous packing near each tube mouth facing the regenerator, the thermal conduction of the means for joining of the porous packing to the monocoque tube bundle, and the thermal conduction of the monocoque tube bundle to the secondary heat transfer fluid.

In some embodiments, the tubes may have a non-circular cross-section if the plating thickness is sufficient for the monocoque to be able to resist the mean-pressure induced non-membrane (azimuthal bending) stress this would entail. This may have the following advantages: (1) Improved heat transfer between the working fluid and the secondary heat transfer fluid because of an increase in heat transfer area; (2) Reduction, through more isothermal contact of the working fluid with the heat exchanger, of losses due to non-isothermal oscillating heat exchange; (3) More freedom in blending the tube ends to the monocoque face; (4) More freedom of construction methods of the mold to cast the sacrificial mandrel; and (5) The possibility of more tube perimeter near the narrowest part of the tube waist region, which may be obtained in certain embodiments with fluted tubes, or low-order polygonal, star-shaped, or multi-lobed cross-sections. This may resist mean-pressure induced axial compressional stress in the tube waist region that may become the dominant stress when the ratio of tube waist dimension (such as average diameter) to tube spacing becomes small.

Figure 7:
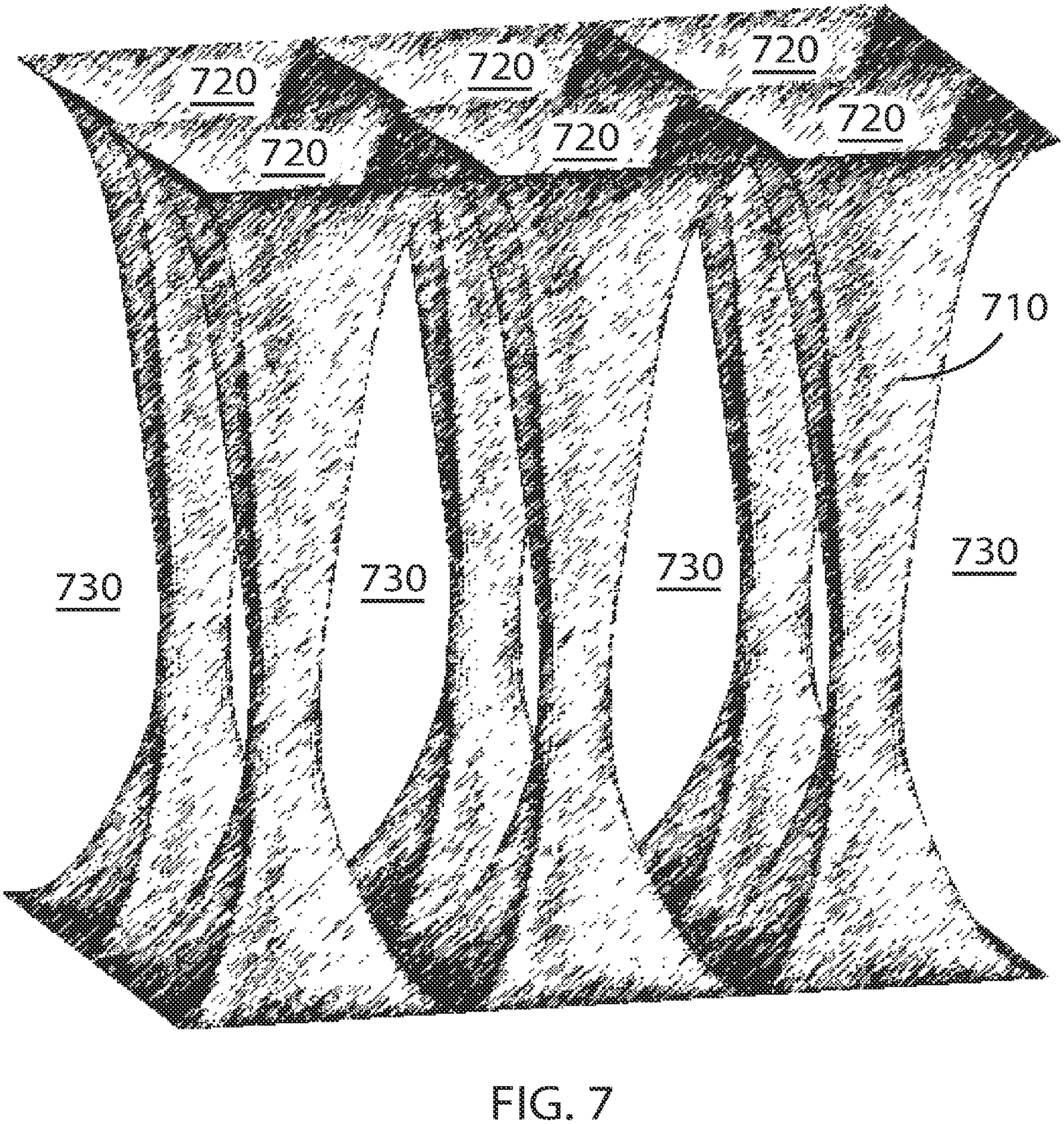
FIG. 7 is a three dimensional detail of an alternative embodiment of the present invention that has fluted tubes.

An embodiment with the non-circular tube cross-section improvement is shown in FIG. 7. Optional mesh/screens or porous packing are not shown for clarity. The monocoque structure 710 consists of a rectangular array (a hexagonal, triangular, or other array is also possible) of fluted tubes that are heavily corrugated near the tube mouths. Working fluid/first fluid flows within the working fluid space 720, and secondary heat transfer fluid/second fluid flows around the tubes in secondary heat transfer fluid space 730. The deep indentations of the tube walls near the tube mouths shorten the thermal relaxation time of the working fluid to the tube walls, keeping more of the working fluid within a thermal penetration depth of the tube walls, while still allowing the working fluid flow to spread across the full width of the tube mouth ends. This approach is an alternative to using a greater number of smaller tubes, and allows for more mechanically robust pins in the mold that casts sacrificial mandrels should the heat exchanger be constructed with a plated mandrel technique.

The improved design may minimize the above mentioned six loss mechanisms of a heat exchanger due to the following reasons: (1) Net heat transfer between a regenerator and its adjoining heat exchanger may be maximized by having many small diameter tubes, by thermal conduction of the mesh/screens that are joined to the heat exchanger on either face and/or by thermal conduction of the porous packing that is joined to the interior of the heat exchanger tubes, by having tubes of non-circular cross section, and/or by the promotion of laminar flow in the open duct opposite the thermal core via the gradual tapering of the tubes on the side away from the regenerator and by the mesh/screen on the face of the heat exchanger away from the regenerator and/or by porous packing within the heat exchanger tubes; (2) Non-isothermal oscillatory heat flow between the working fluid and the heat exchanger may be minimized by having the tube hydraulic radius being about or smaller than the thermal penetration depth, wherein the hydraulic radius is half of the tube's local radius for circular cross-section tubes, or the local tube cross sectional area divided by the local tube perimeter for tubes of non-circular cross-section; and/or by including porous packing within the tubes possessing pores of hydraulic radius that are on the order of or smaller than the thermal penetration depth wherein the pore hydraulic radius is the working fluid volume within the pores divided by the surface area of the pores in contact with the working fluid; (3) Flow losses due to motion of the working fluid may be minimized by the streamlined shape of the doubly tapered tubes, by the minimization of jetting in the open space outside the thermal core, and by not making the tubes any longer than necessary to achieve highly effective heat transfer to the working fluid; (4) Joining loss may be proportional to $p_m^{-1}$, where $p_m$ is the mean pressure of the working fluid—and this loss may be lowered by increasing the mean pressure, which the present invention facilitates by reducing or eliminating the structurally weak flat tube-sheet of the prior art; (5) Pressure drop loss due to the flow of the secondary heat transfer fluid may be minimized by the wide flow path between the narrow waists of the tubes; and (6) Heat transfer between the secondary heat transfer fluid and the heat exchanger may be improved over other heat exchanger geometries by the relatively high Nusselt number of flow over a bank of tubes. In some non-limiting embodiments, the ratio of the pore hydraulic radius to the thermal penetration depth may be about 2% to 20%.

In some thermoacoustic and Stirling machine topologies, those with a toroidal path for the acoustic power that allows for the free flow of working fluid mass, it may be advantageous to apply an asymmetric drag force between working fluid acoustical flow that occurs with and against the direction of the acoustic power. The asymmetric drag force may cause a second-order time-averaged working fluid pressure difference that reduces or eliminates time-averaged mass flow (the so-called Gedeon streaming) that may decrease the efficiency of such machines. The subject heat exchangers may straightforwardly supply this second-order time-averaged pressure difference with some structural differences between the heat exchanger on one side of the regenerator and the other. For example, more jetting of the flow in one duct than the other may be induced by placing a mesh between the heat exchanger and the duct on one heat exchanger but not on the other.

Figure 6:
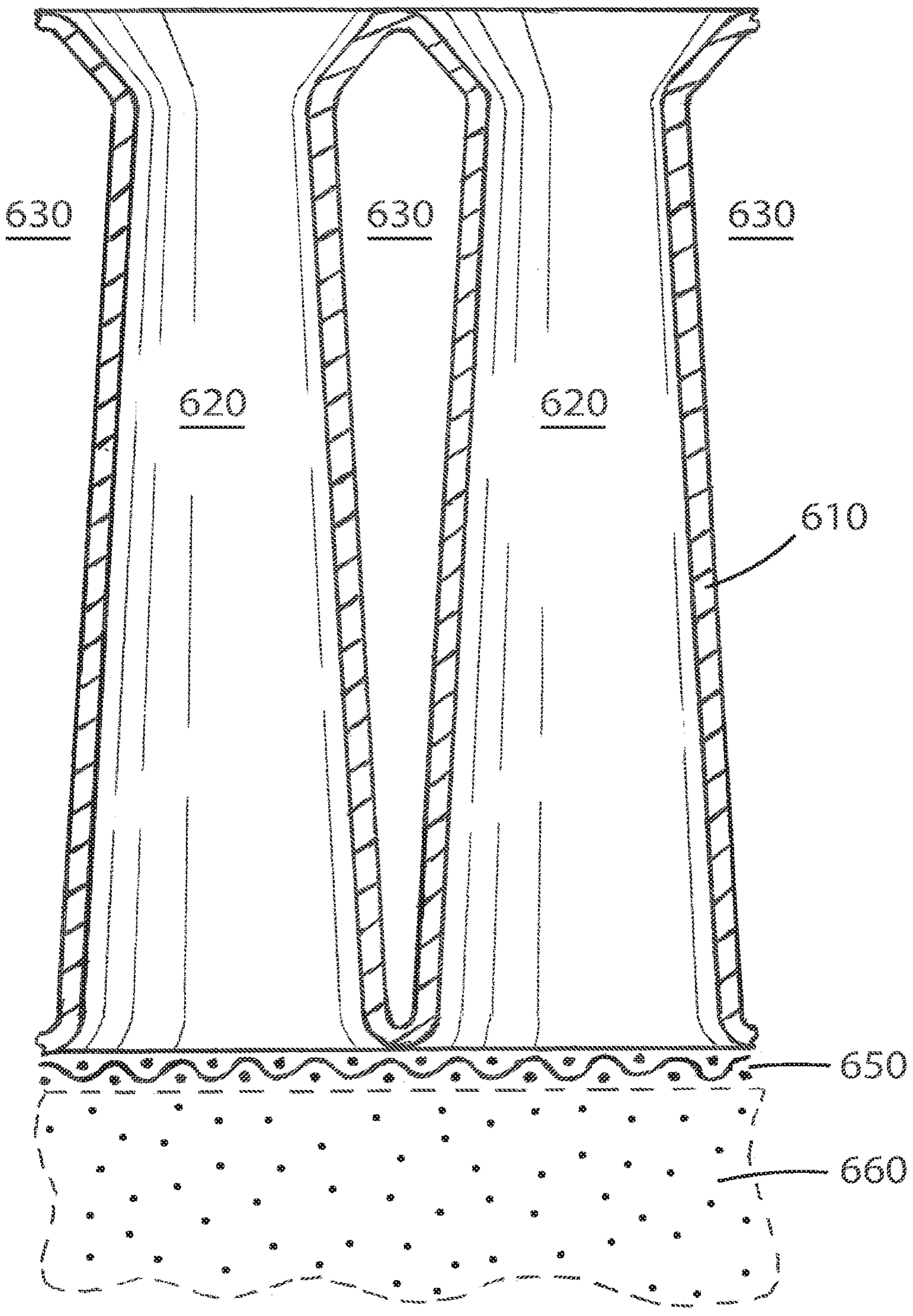
FIG. 6 is a cutaway detail of an alternative embodiment of the present invention that may provide mass flux suppression.

Additionally or alternatively, the shape of the tube tapers between the two heat exchangers may differ. For example, the tube shape of at least one of the heat exchangers may be adjusted so that the heat exchanger provides hydrodynamic mass flux suppression (acting as a so-called jet-pump) as taught in U.S. Pat. No. 6,032,464. To do so, the waist position and/or taper amount or shape may be changed. For example, the position of the waist of the tubes on one exchanger or the other may be moved from near the regenerator to further away from the regenerator, perhaps even most of the way towards the duct, in order to provide mass flux suppression, if needed. Such an embodiment is shown in the cutaway detail of FIG. 6. Working fluid/first fluid flows within the working fluid space 620 of the tubes of the monocoque structure 610, and secondary heat transfer fluid/second fluid flows around the tubes in secondary heat transfer fluid space 630. A mesh/screen 650 may be joined to the monocoque structure on the face adjacent to the regenerator 660, and a mesh/screen may be optionally omitted from the opposite face. As an extreme case, the waist of the tubes may be placed very close to a monocoque face, so much so that a better characterization of the tubes is that they have a single taper from one end to the other rather than a taper at each end. In these embodiments, both ends of the tube have extremum cross section values such that one end has the maximum cross section of the tube, while the opposing end has the narrowest cross section area. Such an extreme case may not change the intent of this invention.

Figure 4:
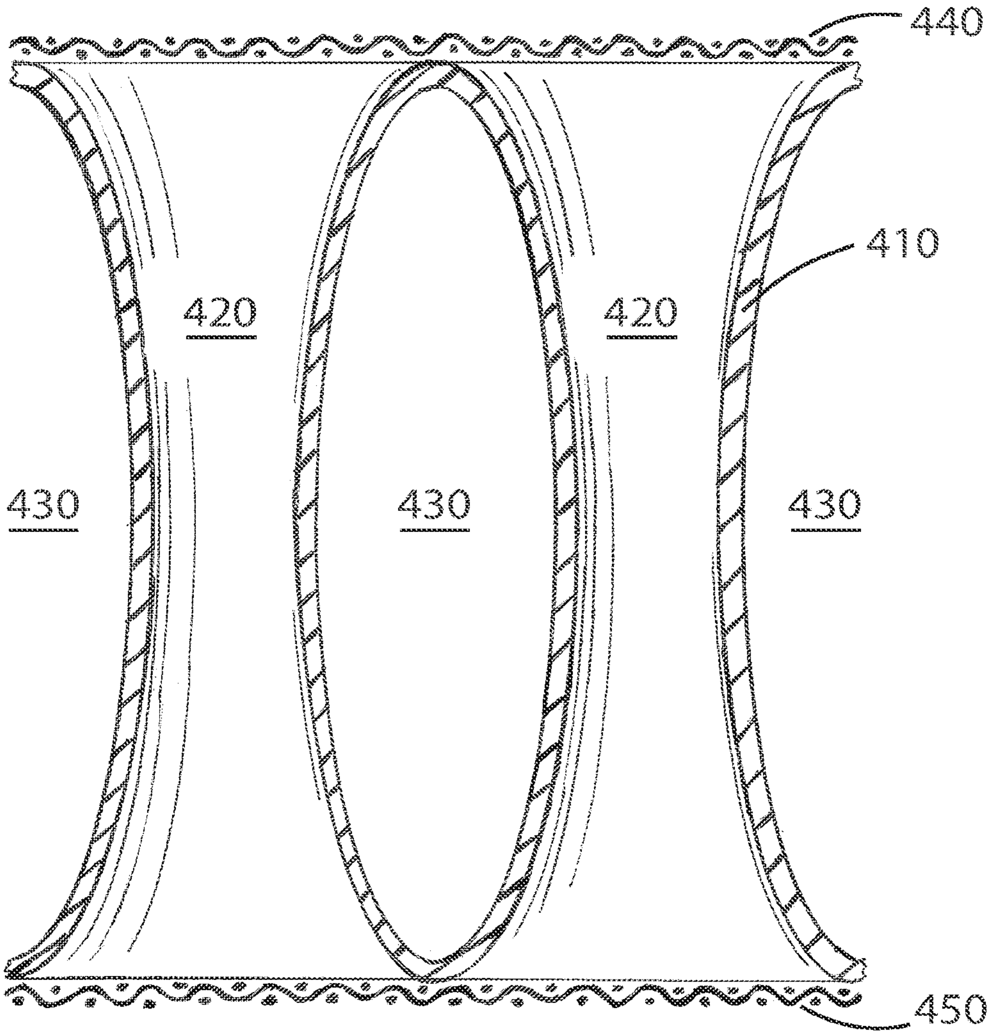
FIG. 4 is a cutaway detail of an alternative embodiment of the present invention that has symmetric and curved wall tubes.
Figure 5:
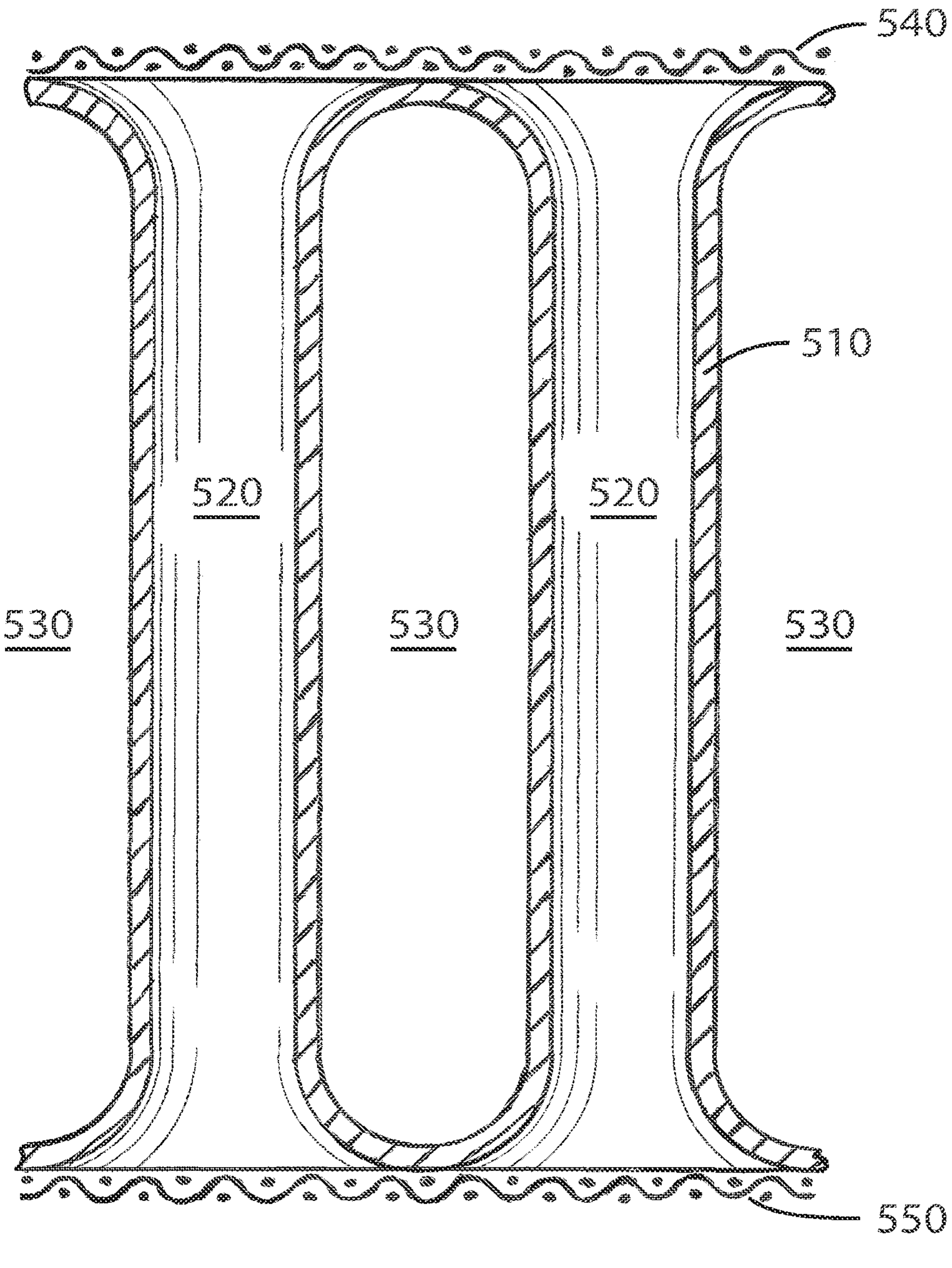
FIG. 5 is a cutaway detail of an alternative embodiment of the present invention that has symmetric tubes with an extended waist region.

As mentioned above, not all of the improvements discussed herein need to be incorporated to have a workable monocoque shell and tube heat exchanger according to the present invention. The cross-section detail of FIG. 4 shows an embodiment with monocoque structure 410 that contains a bundle of symmetric tubes with working fluid space 420 and secondary heat transfer fluid space 430. Optional mesh/screens 440 and 450 may be joined to one or both faces. The tubes may have mostly curved walls in side cross section, as shown in FIG. 4, or mostly conical walls, as shown in most of the other figures. The cross-section detail of FIG. 5 shows an embodiment with a monocoque structure 510 that contains a bundle of tubes with an extended cylindrical waist region, but still advantageously eliminates the flat tube-sheet portion of the prior art shown in FIG. 1, and thus eliminates the prior art problems of structural weakness, occlusion of the regenerator, and likely presence of a vena contracta. Working fluid/first fluid flows in working fluid region 520, secondary heat transfer fluid/second fluid flows around the tubes in secondary heat transfer fluid region 530, and optional mesh/screens 540 and 550 may be joined to one or both faces. This embodiment would be difficult (although not impossible) to produce using a sacrificial mandrel cast in a mold because of the lack of draft angle in the pins and tubes, and the lack of tube taper angle over much of the tube negates much of the advantage of reducing flow separation of the working fluid from the tube walls near the exit end of the tubes. Nevertheless, this is a workable although not recommended design. Working fluid and first fluid are used interchangeably in this disclosure. Similarly, secondary heat transfer fluid and second fluid are used interchangeably.

Workable heat exchangers may be made with a wide range of dimensions. As a specific example, a series of computational fluid dynamics calculations suggests excellent heat transfer with the heat exchanger represented in FIGS. 2 and 3. The tubes are in a hexagonal lattice of nearest neighbor center-to-center spacing of 2 mm, with tube length 15 mm, a waist of 1 mm outside diameter (OD) and 0.75 mm inside diameter (ID), electroless-nickel wall thickness of 0.125 mm, with the tube waist positioned 1.5 mm from the regenerator side, a taper of 1.2 degree half angle for most of the tube away from the regenerator, the tubes making a smooth blend to each other at each end, and with a square-weave copper screen soldered to both faces of the heat exchanger, the screen having a 120×120 mesh (wire spacing of 0.211 mm) and wire diameter of 0.004 inches (0.10 mm). This is for a traveling wave thermoacoustic-Stirling refrigerator of the type described in U.S. Pat. No. 7,908,856, with a helium working fluid of 1.1 MPa mean pressure, the heat exchanger positioned in an environment where the acoustic pressure amplitude is 110 kPa, the specific acoustic impedance (acoustic pressure divided by acoustic particle velocity) is 63 kPa·s/m, and the mean temperature is 280 K (near the average of ambient and cold temperatures of the refrigerator described in FIGS. 8-11 and 16-17 further below). The effectiveness of this heat exchanger is estimated to be greater than 99%, with the monocoque structure tubes and each of the two screens contributing about equally to the effectiveness. Water side secondary heat transfer fluid performance is excellent, with water to metal thermal conductance (UA) of 3.3 MW/K per square meter of heat exchanger helium side frontal area for a free-stream water velocity of 0.1 m/s. This heat exchanger example is structurally robust against the mean pressure of the helium and fatigue of the oscillating pressure. The monocoque wall thickness could have been reduced from 0.125 mm to 0.050 mm and still have had a safety factor of 20 against the longitudinal compressional stress at the tube waist or a safety factor of 33 against the hoop tensile stress at the tube ends assuming an ultimate strength of the electroless-nickel of 700 MPa, leaving sufficient strength to account for fatigue resistance. The tube size was chosen based on the perceived risk of making the mold with small pins for a sacrificial mandrel. Heat transfer was so good in the computational fluid dynamics simulations with the dimensions assumed here, however, that it seemed that the performance of the exchanger might be improved with smaller and shorter tubes. In some embodiments, the ratio of the waist region i.e. minimum tube OD, to the center-to-center tube spacing is about 50% to 70%, while other embodiments have a ratio of about 20% to 80%. To get a better handle on this, analytic optimizations of heat exchanger dimensions were performed.

Example Optimizations of Dimensions

The optimal dimensions for the heat exchanger, when adapted for use in thermoacoustic, Stirling, or similar machines, depend on a multitude of factors of the thermoacoustic, Stirling, or similar machine in which it is incorporated. To give some sense for the range of desirable dimensions, six example optimizations are described here, the results of which are shown in FIGS. 8-19.

Optimization Methods

In the analytic optimizations that follow, the nearest neighbor center-to-center spacing D of the tubes in an assumed hexagonal lattice is stepped over a range of discrete values. At each D, the tube length L and the secondary heat transfer fluid mass flow rate M are varied until the minimum in the total lost work $W_{LostTOTAL}$, described below, is found for that D. The tube geometry scales with D and L. To make progress, some assumptions about the tube geometry are made based on experience with flow separation from the tube walls based on the previous computational fluid dynamics calculations. The tubes are assumed to have an hourglass-like shape of two truncated cones that come together at a waist with an OD that is 60% of the tube spacing D at a position that is 15% of the tube length L from the regenerator. The ODs of the open mouths of the tubes at each end of the tube are assumed to be 95% of the tube spacing D so that adjacent tubes almost touch. The tube wall thickness t is 3.75% of the tube spacing D. When mesh/screens are added to the face of the monocoque shell, the optimization drives the tube length L to be on the order of the tube spacing D for large D so that the tubes can be rather squat and the tube walls have a large angle from their central axis. This angle is taken into account in the wall thickness t, which is calculated normal to the wall rather than normal to the tube central axis, to determine the tube ID along the length of the tube, which in turn affects slightly the Reynolds number and losses at the mouths and within the tubes. In some embodiments, the tapering angle is determined by the tube spacing D and tube length L.

To interpolate between the discrete stepped values of D, parabolic fits are made to the three points in $W_{LostTOTAL}$, L, and M nearest the minimum in $W_{LostTOTAL}$ vs. D. The optimal value of D that gives the lowest total lost work is found from the $W_{LostTOTAL}$ vs. D fit, and that value of D is then used to find the optimal values of L and M from their parabolic fits.

Various thermoacoustic-Stirling machines may be used for inputs on the working fluid side of the optimizations, the choice of which affects the resulting optimal heat exchanger geometry. The inputs used are: (1) the external ambient bath temperature $T_0$, the external non-ambient (hot or cold) bath temperature $T_\$$, the heat into the machine (or out of the machine if negative) from the ambient bath $\dot{Q}_{0in}$, and the heat into the machine from the non-ambient bath $\dot{Q}_{\$in}$, from which the machine's work, First Law efficiency and Second Law efficiency can be derived; (2) whether the heat exchanger under consideration is the ambient or the non-ambient heat exchanger, which affects how lost work is calculated and whether the heat leak from the external loop to the ambient contributes to the lost work tally; (3) the working fluid thermodynamic properties and machine operating frequency, which determine the thermal and viscous penetration depths and are important for the thermoacoustic losses and beneficial heat transfer; (4) thermodynamic properties of the secondary heat transfer fluid; (5) the acoustic pressure amplitude, acoustic volumetric velocity amplitude, and the heat exchanger frontal width and the length along the secondary heat transfer fluid flow direction (for simplicity a rectangular exchanger presented to the working fluid is assumed), which determines the machine power density and affects the relative weighting of losses between the beneficial heat transfer thermal resistance and losses from secondary heat transfer fluid flow friction.

For accurate results, the secondary heat transfer fluid external loop plumbing, the external fan coil unit (FCU) that makes contact to the external bath connected to the heat exchanger under consideration, the number of heat exchangers under consideration connected to the external loop plumbing and FCU, and the loop pump efficiency (taken here to be 75%) also need to be defined because this affects the lost work associated with the secondary heat transfer fluid mass flow rate M. For example, an external loop and FCU with high flow friction will drive the optimization to have a lower M, which in turn allows for the heat exchanger under consideration to have a tighter geometry on the secondary heat transfer fluid side than it would otherwise have. This will be shown in one example below to have a relatively small effect, which is nevertheless taken into account in the optimization.

The beneficial heat transfer between the tubes of the heat exchanger under consideration and the working fluid is calculated with a quasi-static approximation, where heat transfer is integrated in time over the half of the cycle that the working fluid is flowing away from the regenerator, through the heat exchanger, and into the duct, and integrated in space along the length of the tube, using a standard static Nusselt number correlation for straight tubes [see F. P. Incropera and D. P. DeWitt, *Fundamentals of Heat and Mass Transfer,* 4th ed., Wiley, New York, Figure 7.14, p. 383, 1981]; the approximation being that the static correlation holds even for time-varying flows and for tubes that do not have straight walls parallel to the tube central axis. No benefit from heat transfer is taken for the return half of the cycle—flow from the duct back to the heat exchanger and into the regenerator—although some such heat transfer is likely if a laminar flow is assured on the outstroke from the heat exchanger into the duct. The entry effect of enhanced heat transfer is taken into account at the mouth of the tube facing the regenerator. In other words, the Reynolds number on which the Nusselt number depends has a sinusoidal time dependence because of the oscillating working fluid velocity, and a position dependence along the tube because of its dependence directly on the tube ID and indirectly because of the working fluid velocity dependence on the tube ID. It turns out, that at the level of approximation of these analytic optimizations the integrated heat transfer to the tube wall is independent of the shape of the tube—independent of the assumptions on the waist position and diameter—because of various cancellations of the velocity dependence and tube area on tube ID. As seen in the earlier computational fluid dynamics simulations, tube shape can be important to flow separation from the tube wall, but that is not taken into account at the level of these analytic optimizations. The tube length L and the overall smallness of the tube as reflected in the tube spacing D remain important, however, because of the dependence of the integrated heat transfer on the mass flow per tube and overall tube area. The position and time-dependent Nusselt number generates a varying heat transfer coefficient that is integrated over the surface area of the tube ID to finally yield a time-dependent thermal resistance of all the tubes to the working fluid.

Tube thermo-viscous losses—the dissipated power $W_{TubeThermal}$ caused by oscillatory heat transfer accompanied by undesirable temperature swings in the working fluid within the tubes, and the viscous dissipation $W_{TubeViscous}$ caused by the oscillating working fluid motion along the tube walls—are calculated by integrating the local inverse thermal resistance and the local viscous resistance, respectively, of the five-element model of Swift [see G. W. Swift, *Thermoacoustics: A unifying perspective for some engines and refrigerators*, Acoustical Society of America, Melville, NY, eqs. 4.78 and 4.74, pp. 92-94, 2002] over the length of the tubes.

Figure 8:
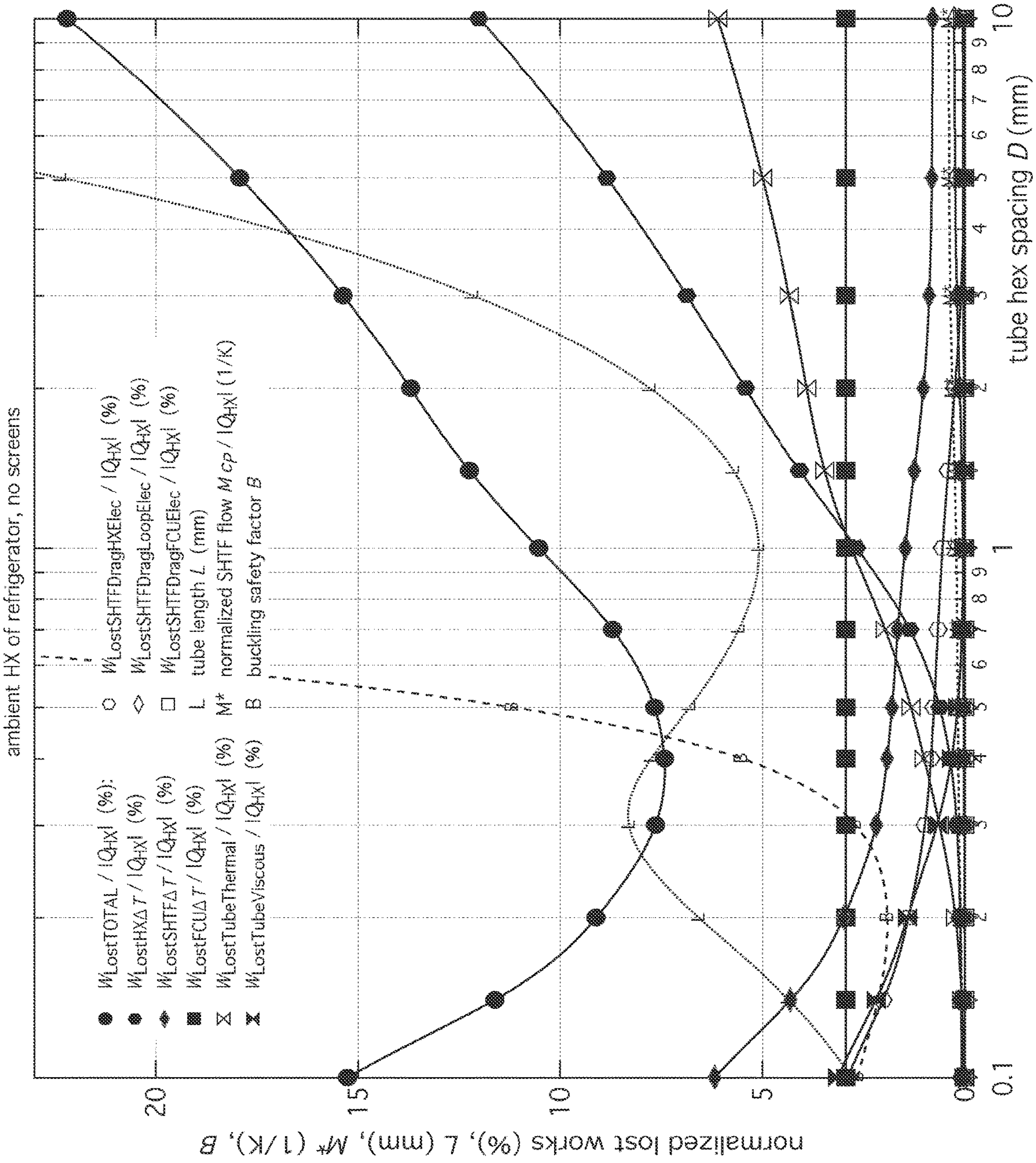
FIG. 8 is a semi-logarithmic plot of optimization results for the ambient heat exchanger of a refrigerator, without mesh/screens.

Beneficial net heat transfer from the mesh/screens, if they are used, is calculated using the stacked square-weave screen matrix Colburn J-Factor correlation found in FIG. 7-8 of Kays and London [see W. M. Kays and A. L. London, *Compact Heat Exchangers,* 3rd ed., Krieger Pub. Co., Malabar, Florida, FIG. 7-8, p. 148, 1998] in a quasi-static approximation similar to that used for the tubes. Heat transfer is integrated in time during the half cycle when the flow is from the regenerator through the heat exchanger and into the duct, assuming the static correlation holds for all phases of the time varying velocity. No benefit is assumed in these optimizations from the flow during the return stroke. A correction factor for the smaller heat transfer of initial screens in an infinite screen matrix is made, varying from 0.75 to 1.00, using the average of values found in FIG. 7-7 of Kays and London [see W. M. Kays and A. L. London, *Compact Heat Exchangers,* 3rd ed., Krieger Pub. Co., Malabar, Florida, p. 147, 1998] and Table 7-6 of Incropera and DeWitt [see F. P. Incropera and D. P. DeWitt, *Fundamentals of Heat and Mass Transfer,* 4th ed., Wiley, New York, p. 379, 1981]. A time-dependent convective heat transfer coefficient and a time-dependent thermal resistance due to working fluid convection are calculated from this.

The mesh/screens also present a conductive thermal resistance. To calculate the total time-dependent convective plus conductive thermal resistance, the mesh/screen is treated like a circular fin, with an arbitrary assumed constant temperature difference imposed between the working fluid at infinity and the temperature of the screen-fin at its (assumed) circular perimeter where the screen makes contact to the tube mouth. For simplicity, the heat capacity of the mesh/screen is ignored, the assumption being that a time integral described below near the end of the calculation is sufficient to capture the intermediate averaging effect of the mesh/screen heat capacity. The analytic solution of the mesh/screen temperature minus the working fluid temperature at infinity—the temperature difference that drives heat out of the mesh/screen and into the working fluid—is the zero-order modified Bessel function of the first kind, where the characteristic decay number of the radial mesh/screen temperature drop is the square root of the heat transfer coefficient times the wet area of the mesh/screen, divided by the total mesh/screen frontal area, the mesh/screen length in the acoustic direction (its thickness), and the effective volumetric thermal conductivity of the mesh/screen metal and its pores. The total time-dependent conductive plus convective thermal resistance is then taken to be the arbitrary assumed imposed temperature difference divided by the total heat found by integrating the mesh/screen to working fluid at infinity temperature difference over the area of the mesh/screen, multiplied by the mesh/screen convective heat transfer coefficient.

As a diagnostic tool, the convective thermal resistance is subtracted from the total convective plus conductive thermal resistance, and what is left over is considered to be a weighted effective mesh/screen conduction thermal resistance; although this distinction of the total resistance into convective and conductive components is not important to finding the lost work due to the total thermal resistance and the optimization of the heat exchanger geometry. A time-dependent fin efficiency for the mesh/screen is calculated as the ratio of the convective screen thermal resistance to the total convective plus conductive screen thermal resistance.

In some of the optimizations, a sandwich assembly of a coarse screen between two or more fine screens is considered, the coarse screen being used to increase the lateral thermal conduction of the sandwich assembly and give mechanical support to the fine screens. In this case, the fine screens are calculated as described above over a circular area equal to the square unit cell area of a coarse square-weave screen single pore. The fin efficiency of the fine screen calculated in this way is used to enhance the thermal contact of the coarse screen to the working fluid, and the conductivity of all the screens in parallel is used to calculate the conduction loss of the sandwich assembly as a whole. In this fine screen fin efficiency calculation the fine screen thermal resistance is increased by 30% in an attempt to correct for the likely spotty contact between the fine and coarse screens. In the two optimizations with the large low-density engine described below (FIGS. 14, 15, 18, and 19), a more sophisticated model than with the other optimizations is used, with small correction factors on the order of 20% in the working fluid velocity and active heat transfer area to account for fine-on-coarse, coarse-on-fine, and monocoque face-on-screen occlusions.

The dissipated power $W_{ScreenThermal}$ from non-isothermal oscillatory heat exchange between the working fluid and the mesh/screens, if they are used, is calculated using the lumped thermal loss resistor model of Swift [see G. W. Swift, *Thermoacoustics: A unifying perspective for some engines and refrigerators*, Acoustical Society of America, Melville, NY, eq. 4.78, p. 94, 2002], which connects the loss due to undesirable working fluid temperature oscillations to the mesh/screen frontal area and the hydraulic radius of the screen. Flow loss $W_{Screen Viscous}$ through the mesh/screens is calculated with the time integral of the product of the sinusoidal volumetric velocity through the screens with the time dependent square-mesh single screen pressure drop due to oscillating flow found through the correlation of Wakeland and Keolian [see R. S. Wakeland and R. M. Keolian, Measurements of Resistance of Individual Square-Mesh Screens to Oscillating Flow at Low and Intermediate Reynolds Numbers, *J. Fluids Eng.,* 125, pp. 851-862, 2003].

An approximation is used for calculating the pressure drop of the secondary heat transfer fluid flowing over the tubes. A standard correlation for flow over a hexagonal tube bank of staggered, straight-wall tubes [see F. P. Incropera and D. P. DeWitt, *Fundamentals of Heat and Mass Transfer,* 4th ed., Wiley, New York, Figure 7.14, p. 383, 1981] is used for the hourglass-like shape of the tube OD. The standard correlation is a function of the maximum flow velocity at the narrowest constriction between tubes in a straight-wall tube bank. In the case of hourglass-like shaped tubes, the value of this maximum velocity averaged over the length of the tubes is known from the overall secondary heat transfer fluid mass flow rate M, the fluid density, the tube shape, and the number of tubes across the width of the heat exchanger. The optimization finds, through iteration, the distribution of secondary heat transfer fluid velocity along the length of the tubes that gives this average, and that simultaneously gives a pressure drop along the length of the tubes that is sufficiently independent of the position along the tube. In other words, the optimization finds how much faster the secondary heat transfer fluid needs to flow over the narrow tube waists than it does over the wider tube mouths such that the pressure drop per tube is constant, to better than a percent, anywhere along the length of the tube while giving the average velocity needed to have the proper total mass flow M. The electrical power dissipated to pump the secondary heat transfer fluid through the tube bank $W_{SHTFDragHXElec}$ is then determined from the total pressure drop along the tube bank, the mass flow rate, secondary heat transfer fluid density, and the assumed pump efficiency.

The same secondary heat transfer fluid velocity distribution is used to calculate Reynolds number, Nusselt number, and heat transfer coefficient as a function of position along the length of the tube. The heat transfer over the tube OD is then integrated along the tube to find the thermal resistance between the secondary heat transfer fluid and the tube wall OD.

The electrical power needed to pump secondary heat transfer fluid flow in the external plumbing loop $W_{SHTFDragLoopElec}$ is calculated with the aid of the Churchill formula for the Darcy friction factor, which is applicable to the laminar, transitional, and turbulent regimes [see S. W. Churchill "Friction factor equation spans all fluid-flow regimes" *Chem. Eng.* 84 (24) pp. 91-92 (1977)]. Multiple heat exchangers under consideration may be connected to a single loop, so their flows are added in calculating the Reynolds number, and the resulting power loss is divided among the exchangers, taking pump efficiency into account. The same is true for summing flows for the FCU attached to the loop in order to get the electrical pump power dissipated by FCU flow $W_{SHTFDragFCUElec}$. Here, an appropriate commercially available FCU is selected, and the manufacturer supplied pressure drop at a certain flow rate is scaled by velocity squared for calculating flow loss (for simplicity, turbulent flow is assumed). Additionally, the manufacturer supplied temperature drop at a heat rate is used to calculate a (linear) FCU thermal resistance to the external bath.

If the heat exchanger under consideration is connected to the non-ambient temperature bath, the power $W_{LoopHeatLeak}$ dissipated due to the heat leak between the ambient and the secondary heat transfer fluid within the external plumbing loop, covered by an assumed amount of insulation, is calculated. This is done to help optimize the external loop pipe diameter to minimize the total lost work, which in turn influences the optimization of the secondary heat transfer fluid mass flow rate M and thus the dimensions of the tubes of the heat exchanger under consideration.

The thermal resistances described above for the heat exchanger under consideration are combined into a total time-dependent heat exchanger thermal resistance $R(\psi)$, calculated as the sum of the time independent thermal resistance of the secondary heat transfer fluid to the monocoque shell, and the parallel combination of the time-dependent thermal resistance of the tubes to the working fluid and, if mesh/screens are used, the time-dependent convective plus conductive thermal resistance of mesh/screens on either heat exchanger face to the working fluid, where $\psi$ is the time phase of the time-dependent working fluid volumetric velocity $U(\psi)=U_0 \cos(\psi)$. For simplicity, the thermal resistance of the monocoque tube bundle shell itself has been neglected, justified by experience gained from the earlier computational fluid dynamics computations that included the shell conductivity. A time-dependent working fluid "convective heat," $Q(\psi)=\pi Q_{HX} \cos(\psi)$, during the outward half of the stroke when $-\pi/2<\psi<\pi/2$, and $Q(\psi)=0$ during the inward half of the stoke when $\psi$ is outside this range, is assumed to flow from the secondary heat transfer fluid, through the heat exchanger under consideration, and into the working fluid as the working fluid flows out of the regenerator, where $Q_{HX}$, which is equal to either $Q_{0in}$ or $Q_{\$in}$, is the time averaged heat flowing into the heat exchanger under consideration from the secondary heat transfer fluid. After these long calculations, the centrally important time averaged temperature drop between the working fluid and the secondary heat transfer fluid is then calculated as an average temperature drop $$\Delta T_{HX} = \frac{-1}{2\pi}\int_{-\pi/2}^{\pi/2} R(\psi)Q(\psi)d\psi.$$

The temperature drop $\Delta T_{FCU}$ between the secondary heat transfer fluid external fan coil unit outlet temperature and the relevant external bath temperature $T_{Bath}$—where $T_{Bath}$ is fixed by one of the inputs of the optimization to be either the external ambient bath temperature $T_0$ or the external non-ambient hot or cold bath temperature $T_\$$—is determined by the heat into the heat exchanger under consideration $Q_{HX}$, the number of heat exchangers connected to the FCU, and the input thermal resistance for the assumed external FCU. The secondary heat transfer fluid temperature drop $\Delta T_{SHTF}$, averaged across the transverse extent of the heat exchanger under consideration, is taken to be $\Delta T_{SHTF}=Q_{HX}/(2Mc_p)$, where $c_p$ is the secondary heat transfer fluid heat capacity. From $T_{Bath}$, $\Delta T_{FCU}$, $\Delta T_{SHTF}$, and $\Delta T_{HX}$, the external fan coil unit secondary heat transfer fluid outlet temperature $T_{FCU}=T_{Bath}+\Delta T_{FCU}$, the average secondary heat transfer fluid temperature in the loop $T_{SHTF}=T_{FCU}+\Delta T_{SHTF}$, and the average working fluid temperature $T_{WF}=T_{SHTF}+\Delta T_{HX}$ can be determined.

With the temperatures established, it becomes possible to calculate the lost work, a formalism described, for example, by Swift [see G. W. Swift, *Thermoacoustics: A unifying perspective for some engines and refrigerators*, Acoustical Society of America, Melville, NY, pp. 135-141, 2002] and Bejan [see A. Bejan, *Advanced Engineering Thermodynamics,* 2nd ed., Wiley, New York, 1997], where power dissipation mechanisms are weighted by various ratios of the ambient temperature $T_0$ to the temperatures where the dissipation occurs, to account for the dependence of machine inefficiency (the useful work not delivered by a heat engine, or the extra work needed to drive a refrigerator or heat pump) on the temperature at the location of the various dissipation mechanisms within the machine. The lost works due to tube thermo-viscous dissipation and for mesh/screen oscillatory heat exchange and flow loss are found by multiplying those power dissipations found earlier by $T_0/T_{WF}$:

$$W_{LostTubeThermal}=W_{TubeThermal}T_0/T_{WF},$$

$$W_{LostTubeViscous}=W_{TubeViscous}T_0/T_{WF},$$

$$W_{LostScreenThermal}=W_{ScreenThermal}T_0/T_{WF},$$

$$W_{LostScreenViscous}=W_{ScreenViscous}T_0/T_{WF}.$$

The secondary heat transfer fluid pressure drop lost works and the heat-leak lost work are found by multiplying the secondary heat transfer fluid pressure drop powers dissipated at the heat exchanger, loop plumbing, and the FCU, and the magnitude of the heat-leak power into or out of the secondary heat transfer fluid (per heat exchanger), by $T_0/T_{SHTF}$:

$$W_{LostSHTFDragHXElec}=W_{SHTFDragHXElec}T_0/T_{SHTF},$$

$$W_{LostSHTFDragLoopElec}=W_{SHTFDragLoopElec}T_0/T_{SHTF},$$

$$W_{LostSHTFDragFCUElec}=W_{SHTFDragFCUElec}T_0/T_{SHTF},$$

$$W_{LostLoopHeatLeak}=W_{LoopHeatLeak}T_0/T_{SHTF}.$$

The lost works associated with the temperature deficits $\Delta T_{FCU}$, $\Delta T_{SHTF}$, and $\Delta T_{HX}$ are found by considering the thermoacoustic or Stirling machine as a whole. As the temperature deficits increase or decrease during the optimization of the heat exchanger under consideration—and the remaining parts of the machine have to pump heat over an increased or decreased, respectively, temperature span in the case of a refrigerator or heat pump, or generate useful work from a smaller or larger, respectively, temperature span in the case of a heat engine—it is assumed that the remaining parts of the machine have an efficiency that is a constant fraction of the Carnot efficiency. The difference in the work powers can be found to be, after some algebraic manipulation, to be in the case that the heat exchanger under consideration is the ambient heat exchanger:

$$W_{LostFCU\Delta T} = \eta_R Q_{HX}\left(\frac{T_{FCU}}{T_\$} - \frac{T_0}{T_\$}\right),$$

$$W_{LostSHTF\Delta T} = \eta_R Q_{HX}\left(\frac{T_{SHTF}}{T_\$} - \frac{T_{FCU}}{T_\$}\right),$$

$$W_{LostHX\Delta T} = \eta_R Q_{HX}\left(\frac{T_{WF}}{T_\$} - \frac{T_{SHTF}}{T_\$}\right);$$

and for the case that the heat exchanger under consideration is the non-ambient heat exchanger:

$$W_{LostFCU\Delta T} = \eta_R Q_{HX}\left(\frac{T_0}{T_{FCU}} - \frac{T_0}{T_\$}\right),$$

$$W_{LostSHTF\Delta T} = \eta_R Q_{HX}\left(\frac{T_0}{T_{SHFT}} - \frac{T_0}{T_{FCU}}\right),$$

$$W_{LostHX\Delta T} = \eta_R Q_{HX}\left(\frac{T_0}{T_{WF}} - \frac{T_0}{T_{SHTF}}\right);$$

where $W_{LostFCU\Delta T}$, $W_{LostSHTF\Delta T}$, and $W_{LostHX\Delta T}$, are the lost works associated respectively with the temperature deficits $\Delta T_{FCU}$, $\Delta T_{SHTF}$, and $\Delta T_{HX}$;

$$\eta_R = \left(1 + \frac{Q_{0in}}{Q_{\$in}}\right) \Big/ \left(1 - \frac{T_0}{T_\$}\right)$$

functions somewhat like a generalized signed efficiency relative to the Carnot efficiency, but which has a definition that is independent of which heat exchanger of the thermal core is under consideration and that is independent of the intended function of the machine, be it a refrigerator, a heat pump, a conventional heat engine that runs between a hot temperature and a lower ambient temperature, or an unconventional engine that runs between the ambient temperature and a lower cold temperature.

The total lost work $W_{LostTOTAL}$ shown in FIGS. 8-19 is the sum of the eleven aforementioned lost work components: $W_{LostHX\Delta T}$, $W_{LostSHTF\Delta T}$, $W_{LostFCU\Delta T}$, $W_{LostLoopHeatLeak}$, $W_{LostTubeThermal}$, $W_{LostTubeViscous}$, $W_{LostScreenThermal}$, $W_{LostScreenViscous}$, $W_{LostSHTFDragHXElec}$, $W_{LostSHTFDragLoopElec}$, and $W_{LostSHTFDragFCUElec}$, some of which may be zero. In these optimization calculations the join loss is not considered because it is assumed to be independent of the heat exchanger dimensions—the heat exchanger approximated as presenting a completely isothermal porous medium to the working fluid for the purpose of join loss. It should be added to the total lost work tally outside these optimizations. Also, no attempt has been made here to include minor losses that may occur within the heat exchanger due to changes in the diameter of the tubes. Minor loss for flow into and from the duct is assumed to be negligible because of a gradual taper in the tubes away from the regenerator and/or the presence of a mesh/screen on the heat exchanger face facing the duct.

To make sure that the tubes are structurally sound, rough analytic calculations of hoop, axial, and two-dimensional von Mises stresses are made. A buckling safety factor is estimated based on the inverse of an integral over the length of the tube of the product of the local slenderness ratio squared and the local longitudinal tube wall stress. Under most of the situations presented below, near where total lost work is minimized, the strength and stiffness of the tubes are sufficient; but where they become questionable, a finite element method calculation should be performed.

Analytic Optimization Results

Figure 9:
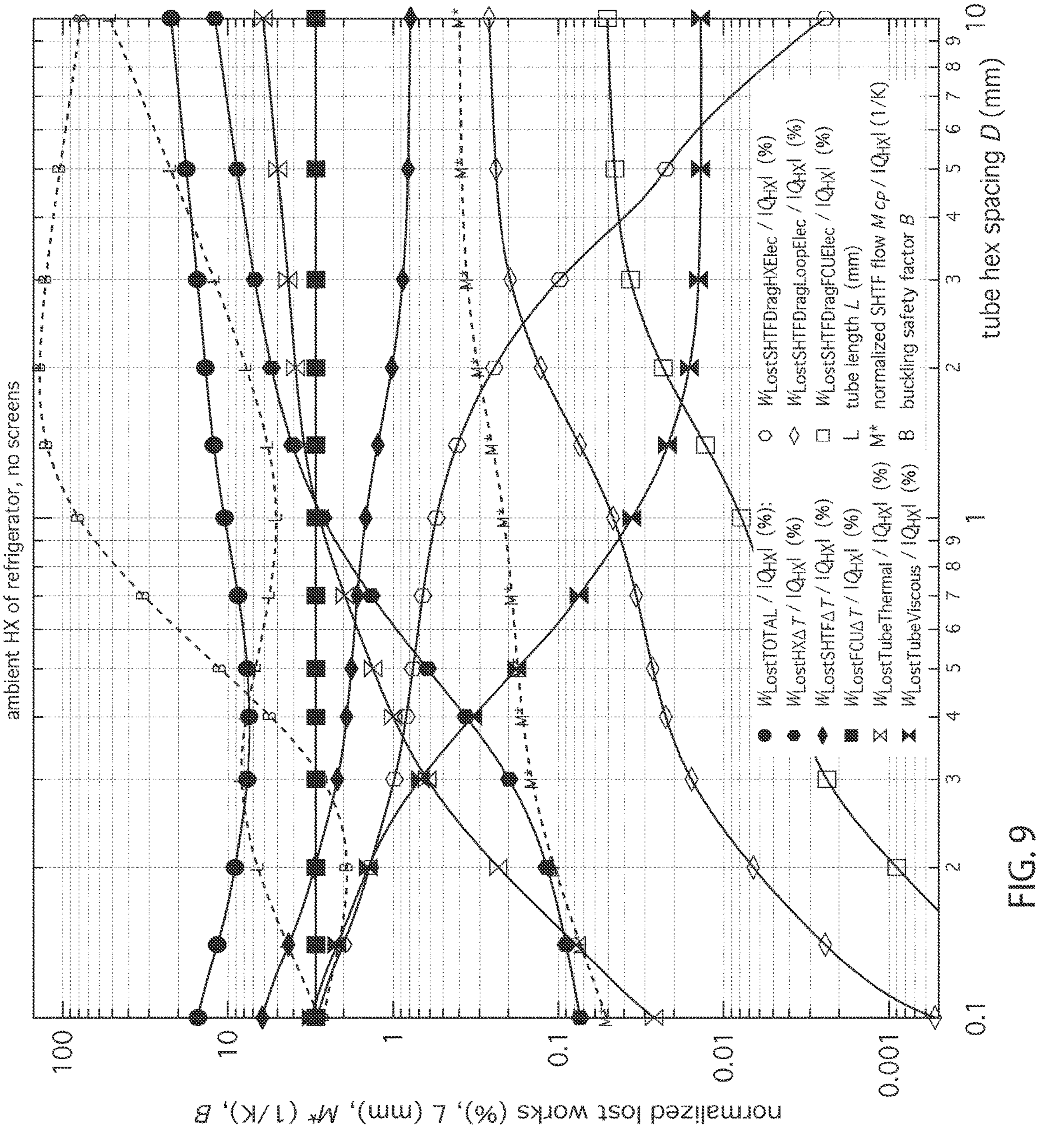
FIG. 9 is a log-log plot of optimization results for the ambient heat exchanger of a refrigerator, without mesh/screens.

FIGS. 8 and 9 show the result of an optimization for the ambient heat exchanger of a three-stage inline thermoacoustic-Stirling refrigerator according to U.S. Pat. No. 7,908,856, for a commercial freezer application operating at 82.0 Hz in a 1.1 MPa helium working fluid (properties at 316 K: density=1.676 kg·m$^{-3}$, viscosity=20.66 μPa·s, constant pressure heat capacity=5193 J·kg$^{-1}$·K$^{-1}$, thermal conductivity=0.1582 W·m$^{-1}$·K$^{-1}$, heat capacity ratio=1.667). A bare electroless nickel monocoque tube bundle without a mesh/screen on either face is assumed for this optimization (nickel-phosphorus Young's modulus=64 GPa, tensile strength≈560 MPa). The ambient heat input per heat exchanger under consideration $Q_{0in}=Q_{HX}$ is −1.889 kW (negative value indicating heat leaving the machine) at an ambient bath temperature $T_0$ of 305 K, and the cold heat input per stage $Q_{\$in}$ is +1.208 kW at a cold bath temperature $T_\$$ of 248 K. These values give an $\eta_R$=2.454, which is held constant throughout the optimization. The heat exchanger frontal dimensions are 178.9 mm×178.9 mm, for what may be considered to be a relatively medium heat exchanger power density of 59.0 kW/m$^2$. The acoustic pressure amplitude is 110.0 kPa and the acoustic volumetric velocity amplitude is 0.03418 m$^3$/s. An external fan coil unit that rejects the refrigerator's exhaust heat to the ambient environment is assumed to be relatively close to the refrigeration unit, with a round-trip loop length of 8 m of nominal ¾" Schedule 40 PVC pipe (ID=20.9 mm), the FCU thermal resistance being 0.82 K/kW and with a manufacturer's provided data pressure drop of 2690 Pa (0.9 ft-wg) for a volume flow rate of 524 ml/s (8.3 gal/min). Heat leak between the secondary heat exchanger and the ambient is beneficial for ambient heat exchangers so no lost work from heat leak is included in the lost work tally. The secondary heat transfer fluid is assumed to be an ethylene glycol antifreeze mixed 50% with water (properties at 313 K: density=1080 kg·m$^{-3}$, viscosity=2.3 mPa·s, heat capacity=3454 J·kg$^{-1}$·K$^{-1}$, thermal conductivity=0.424 W·m$^{-1}$·K$^{-1}$).

The symbols in FIGS. 8 and 9 show, on a semi-log and log-log plot respectively, the results of the various lost work components, normalized by (divided by) the magnitude of the heat exchanger heat $|Q_{HX}|$ for chosen representative tube spacings D where the tube length L and the secondary heat transfer fluid mass flow rate M were varied to find the minimum in the total lost work $W_{LostTOTAL}$ (filled circles) at each selected D. The lines are cubic spline interpolations to connect the symbols. Also shown connected by dashed cubic spline lines are the tube length L (symbol L), an approximate buckling safety factor B (symbol B), and the secondary heat transfer fluid mass flow rate M normalized by (divided by) $|\dot{Q}_{HX}|/c_p$ (symbol M*). The optimal spacing D is found to be 0.398 mm, for a minimum in the total lost work $W_{LostTOTAL}$=140.3 W ($W_{LostTOTAL}/|\dot{Q}_{HX}|$=7.43%), with L=7.77 mm, and M=0.0899 kg/s ($M c_p/|\dot{Q}_{HX}|$=0.1643 $K^{-1}$). The linear scale in FIG. 8 is perhaps best for appreciating the magnitude of the lost work components, but the log scale in FIG. 9 may more easily reveal the physics of the variables' interactions.

The tube thermal lost work $W_{LostTubeThermal}$ (open hourglass symbols) due to oscillatory temperature swings in the working fluid decreases at small D but the lost work from tube viscous loss $W_{LostTubeViscous}$ (filled hourglasses) increases at small D. The minimum in the total lost work occurs near where these two curves cross. Also important at small D is the lost electrical work from pumping the secondary heat transfer fluid over the small tubes $W_{LostSHTFDragHXElec}$ (open hexagons). Because of this loss, the optimization lowers the secondary heat transfer fluid mass flow M (normalized M symbol M*). But the lower M increases the secondary heat transfer fluid temperature deficit $\Delta T_{SHTF}$ and its associated lost work $W_{LostSHTF\Delta T}$ (filled diamonds), which becomes a major loss component that represents the increased work needed by the refrigerator to operate over an increased temperature span as its ambient heat exchanger temperature rises above the ambient bath temperature.

At large D, the tubes collectively have insufficient surface area to make good thermal contact to the working fluid, which increases the temperature deficit $\Delta T_{HX}$, causing the refrigerator to have to pump its exhaust heat to a higher temperature, increasing its associated lost work $W_{LostHX\Delta T}$ (filled hexagons), the major loss component that lowers the machine efficiency. Additionally, the poor thermal contact increases tube thermal lost work $W_{LostTubeThermal}$ because of increasing oscillating temperature swings in the working fluid within the tubes. With a relatively open path for the secondary heat transfer fluid at large D around the tubes within the heat exchanger under consideration, the optimization allows for a larger M, which drops the losses due to the temperature deficit $\Delta T_{SHTF}$. And although the lost works due to pumping the secondary heat transfer fluid through the external plumbing loop $W_{LostSHTFDragLoopElec}$ (open diamonds) and the FCU $W_{LostSHTFDragFCUElec}$ (open squares) increase at large D, they still remain small and nearly negligible. The lost work from the thermal resistance of the FCU $W_{LostFCU\Delta T}$ (filled squares), however, is more important than its pumping loss, although it remains largely independent of D. Buckling safety factor of the relatively slender tubes near the minimum in total lost work (symbol B), rather than tube strength (graph of von Mises stress not shown, but is everywhere less than 20 MPa), is marginal and should be checked with a more thorough finite element calculation. It can be improved with a thicker tube.

Figure 10:
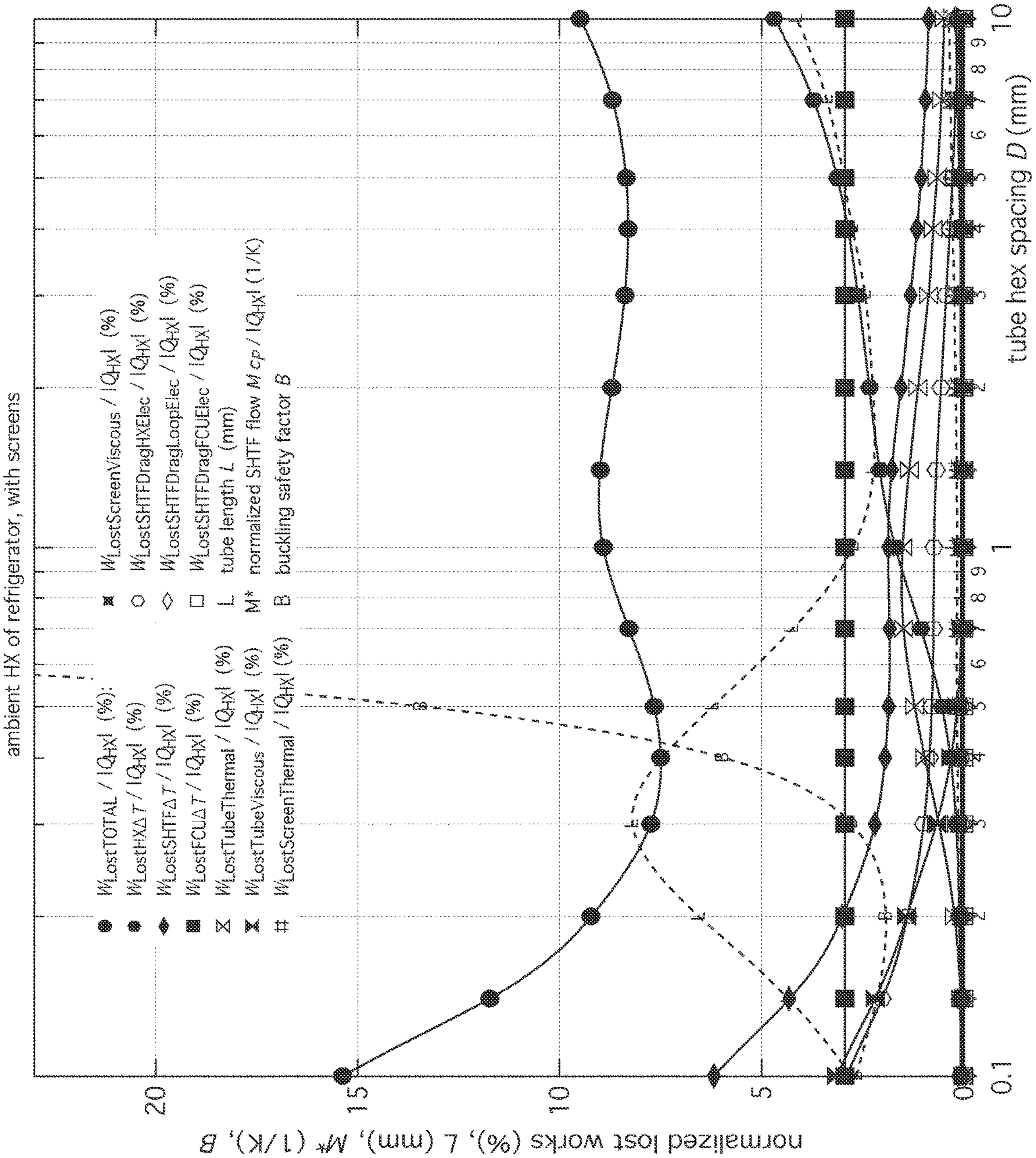
FIG. 10 is a semi-logarithmic plot of optimization results for the ambient heat exchanger of a refrigerator, with mesh/screens.
Figure 11:
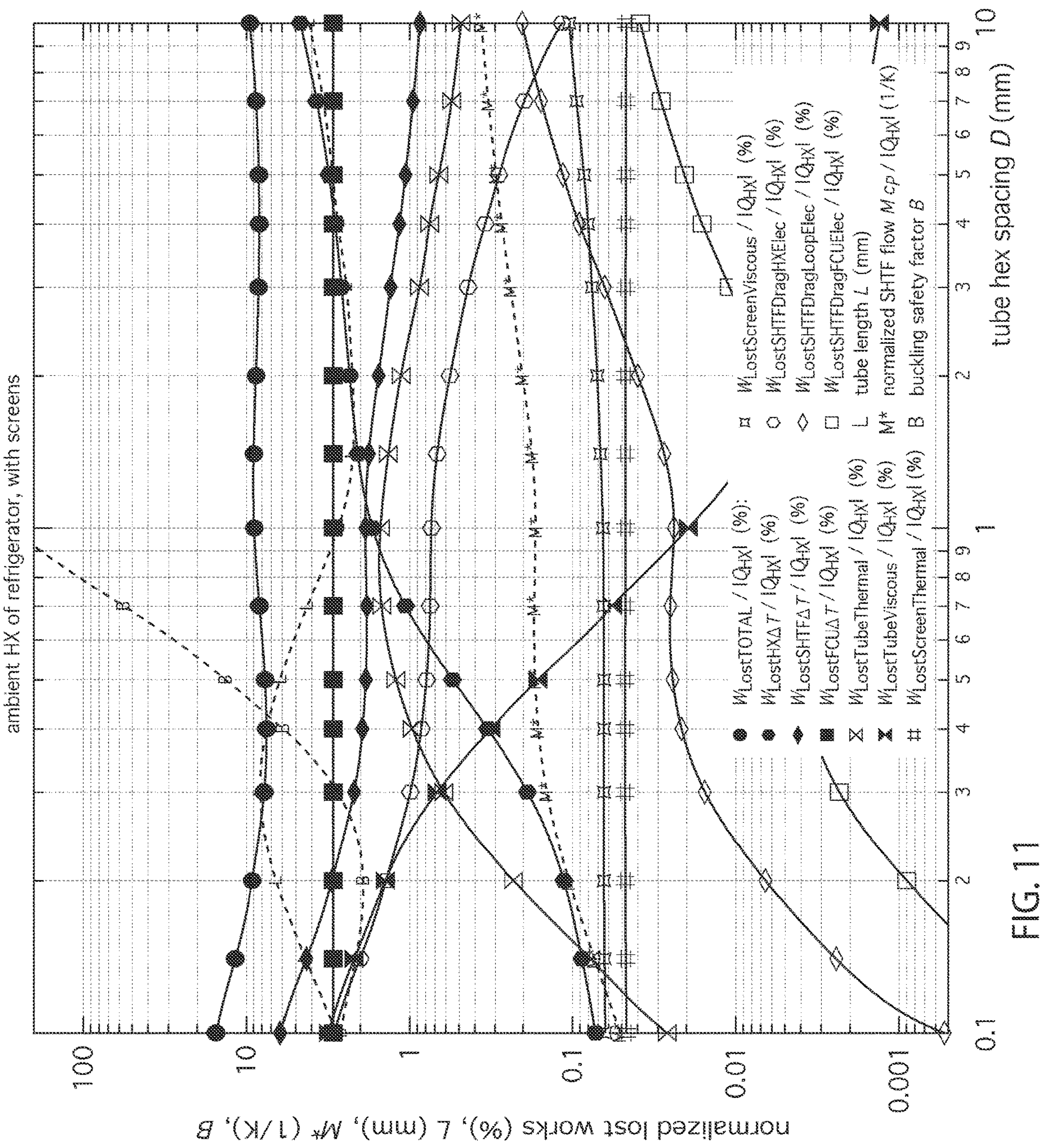
FIG. 11 is a log-log plot of optimization results for the ambient heat exchanger of a refrigerator, with mesh/screens.

FIGS. 10 and 11 show the results of the same ambient heat exchanger in the same refrigerator as in FIGS. 8 and 9, but with the addition of a single copper square-weave mesh/screen on each face of the monocoque tube bundle—of mesh number 100 (100 wires per inch, or wire center-to-center spacing of 0.254 mm), wire diameter of 0.005 inch (0.127 mm), and wire thermal conductivity of 400 $W \cdot m^{-1} \cdot K^{-1}$—or with both copper mesh/screens placed together on one face of the monocoque tube bundle, as the analytic optimization does not distinguish between these possibilities (a CFD calculation would). The first minimum is nearly unchanged at D=0.411 mm, with total lost work $W_{LostTOTAL}$=141.6 W ($W_{LostTOTAL}/|\dot{Q}_{HX}|$=7.50%), optimal tube length of L=7.35 mm, and mass flow rate M=0.0895 kg/s ($M c_p/|\dot{Q}_{HX}|$=0.1637 $K^{-1}$). However, a second minimum in the total lost work appears at D=4.12 mm, with $W_{LostTOTAL}$=156.8 W ($W_{LostTOTAL}/|\dot{Q}_{HX}|$=8.30%), optimal tube length at the minimum of L=2.78 mm, and mass flow rate M=0.1513 kg/s ($M c_p/|\dot{Q}_{HX}|$32 0.277 $K^{-1}$). By providing good thermal contact to the working fluid, the mesh/screens allow good performance over a range of much larger tube spacing D. In effect, because the mesh/screen makes better thermal contact to the working fluid than do the tubes at large D, the optimization brings the length L of the tubes down to decrease the losses on the tubes, leaving them just long enough to allow for sufficient passage of the secondary heat transfer fluid over the tubes. This breaks down at higher D where the mesh/screens have insufficient thermal conduction across the wider tube mouths, and the loss from the temperature deficit $\Delta T_{HX}$ increases. For this case, the first minimum is slightly lower than the second minimum. Nevertheless, the second minimum with tubes of larger diameter and shorter length may be desirable due to manufacturing considerations.

Particularly in the case of the second minimum, it may be beneficial to place mesh/screens on only the face of the monocoque tube bundle that faces the regenerator, leaving no mesh/screen on the face facing the open duct, because of joining losses that occur at transitions between regions of nearly adiabatic conditions in the working fluid and nearly isothermal regions. If the working fluid penetration depth is small compared to the local tube hydraulic radius, which scales with D, as could easily be the case near the second minimum, the working fluid space within the tube could become nearly adiabatic. Should this space be enclosed by two nearly isothermal mesh/screens there is the potential for two additional joining loss transitions. Thus it may be better to give up the advantage of duct laminar flow promotion that a mesh/screen on the duct facing face of the heat exchanger would provide in order to avoid an additional joining loss on each side of that mesh/screen. Conceptually, that mesh/screen could be doubled up with another mesh/screen next to the regenerator to not affect the total thermal contact to the working fluid. Similarly, it may be advantageous to favor the placement of conductive porous plug material within the tubes to be near the regenerator end of the tubes to avoid creating unnecessary adiabatic-isothermal transitions when the tube hydraulic radius becomes large compared to the thermal penetration depth.

Figure 12:
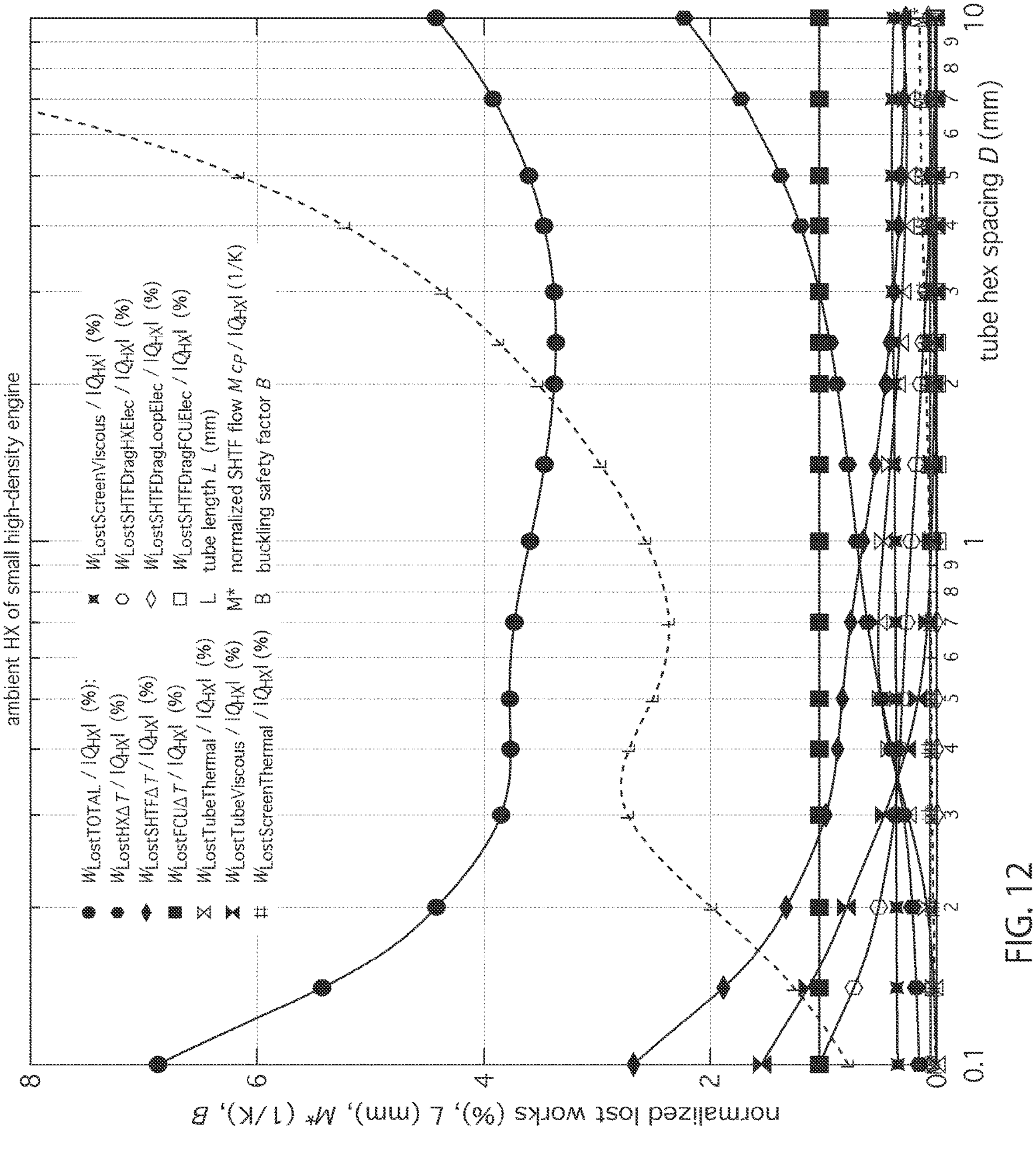
FIG. 12 is a semi-logarithmic plot of optimization results for the ambient heat exchanger of a small high-density engine, with mesh/screens.
Figure 13:
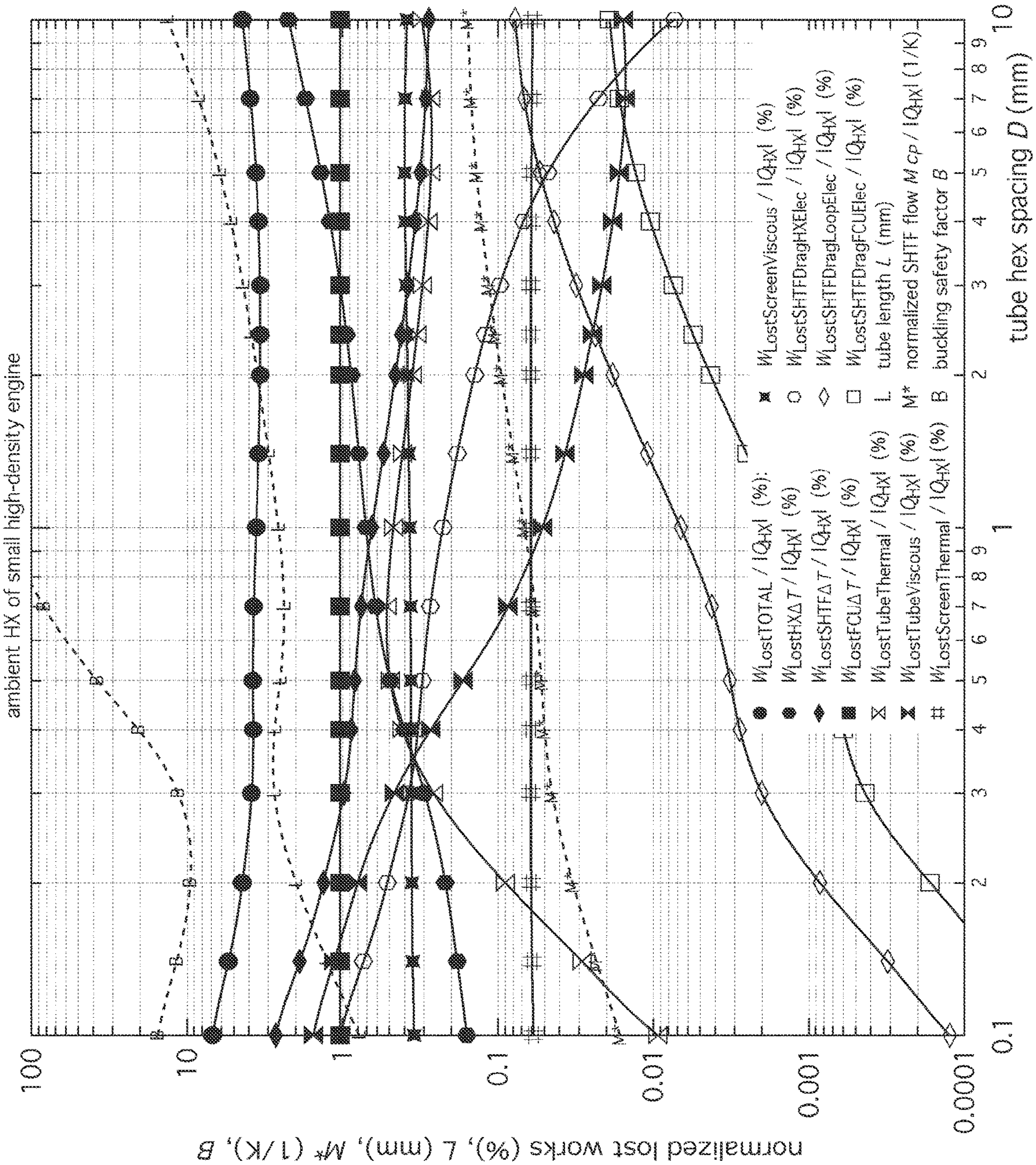
FIG. 13 is a log-log plot of optimization results for the ambient heat exchanger of a small high-density engine, with mesh/screens.

FIGS. 12 and 13 show the results for the ambient heat exchanger of a small three-stage high-density engine in an automotive application operating at 239 Hz in a 2.4 MPa helium working fluid (properties at 418 K: density=2.764 $kg \cdot m^{-3}$, viscosity=24.98 μPa·s, constant pressure heat capacity=5193 $J \cdot kg^{-1} \cdot K^{-1}$, thermal conductivity=0.1933 $W \cdot m^{-1} \cdot K^{-1}$, heat capacity ratio=1.667). The same 100-mesh, 0.005" wire, copper screens as in FIGS. 10 and 11 are used, one each on both faces of an electroless nickel tube bundle. The ambient heat input per heat exchanger under consideration $\dot{Q}_{0in}=\dot{Q}_{HX}$ is −4.811 kW at an ambient bath temperature $T_0$ of 396 K, and the hot heat input per stage $\dot{Q}_{\$in}$ is 5.210 kW at a hot bath temperature $T_\$$ of 490 K, giving an $\eta_R$=0.398. The heat exchanger frontal dimensions are 100.0 mm×100.0 mm, for what may be considered to be a relatively high heat exchanger power density of 481 $kW/m^2$, eight times that of the refrigerator example. The acoustic pressure amplitude is 165.6 kPa and the acoustic volumetric velocity amplitude is 0.04339 $m^3/s$. The same external fan coil unit used in the refrigerator examples of FIGS. 8-11 is assumed to reject the engine's exhaust heat to the ambient environment, with a round-trip loop length of 2 m of nominal ½" pipe (ID=15.8 mm), the FCU thermal resistance again being 0.82 K/kW and with a manufacturer's provided data pressure drop of 2690 Pa for a volume flow rate of 524 ml/s. The secondary heat transfer fluid is again assumed to be an ethylene glycol antifreeze mixed 50% with water (properties at 396 K: density=1003 kg·m$^{-3}$, viscosity=0.50 mPa·s, heat capacity=3751 J·kg$^{-1}$·K$^{-1}$, thermal conductivity=0.412 W·m$^{-1}$·K$^{-1}$). In this case the second minimum, with a total lost work $W_{LostTOTAL}$=161.8 W ($W_{LostTOTAL}/|\dot{Q}_{HX}|$=3.36%), at D=2.48 mm, L=3.49 mm, and M=0.1358 kg/s ($M c_p/|\dot{Q}_{HX}|$=0.1129 K$^{-1}$), is lower than the first minimum, with $W_{LostTOTAL}$=180.6 W ($W_{LostTOTAL}/|Q_{HX}|$=3.75%), at D=0.441 mm, L=2.66 mm, and M=0.658 kg/s ($M c_p/|\dot{Q}_{HX}|$=0.0513 K$^{-1}$).

Figure 14:
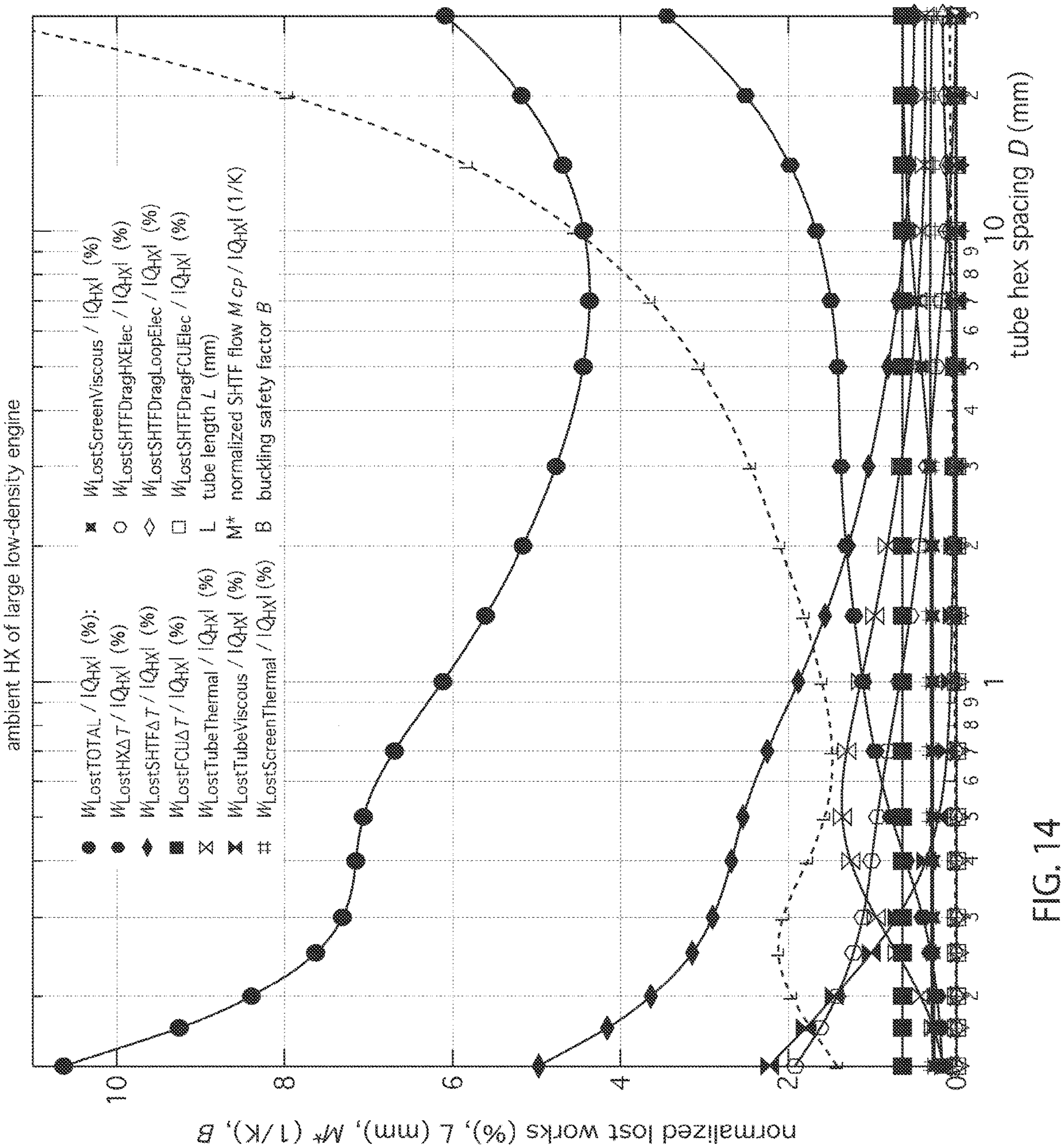
FIG. 14 is a semi-logarithmic plot of optimization results for the ambient heat exchanger of a large low-density engine, with mesh/screens.
Figure 15:
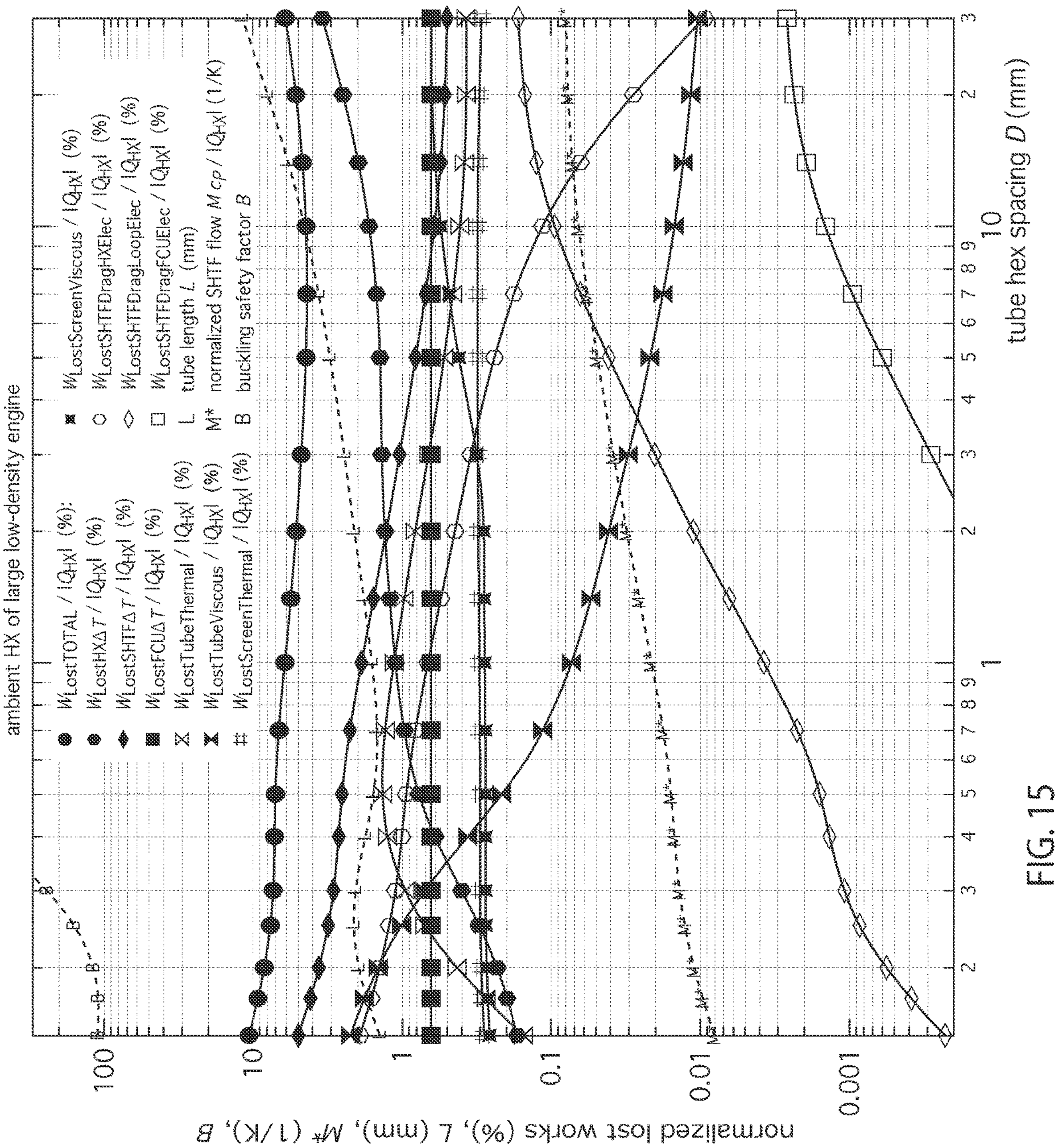
FIG. 15 is a log-log plot of optimization results for the ambient heat exchanger of a large low-density engine, with mesh/screens.

FIGS. 14 and 15 show the results for the ambient heat exchanger of a large three-stage low-density engine in a power utility application operating at 380 Hz in a 10%-90% helium-argon mixture at 200 kPa absolute pressure (properties at 318 K: density=2.750 kg·m$^{-3}$, viscosity=24.55 μPa·s, constant pressure heat capacity=571.8 J·kg$^{-1}$·K$^{-1}$, thermal conductivity=0.02785 W·m$^{-1}$·K$^{-1}$, heat capacity ratio=1.667). The same 100-mesh, 0.005" wire, copper screens as in FIGS. 10-13 are used on both faces of an electroless nickel tube bundle. The ambient heat input per heat exchanger under consideration $\dot{Q}_{0in}=\dot{Q}_{HX}$ is −67.105 kW at an ambient bath temperature $T_0$ of 300 K, and the hot heat input per stage $\dot{Q}_{\$in}$ is 88.642 kW at a hot bath temperature $T_\$$ of 700 K, giving an $\eta_R$=0.425. The heat exchanger frontal dimensions are 1.00 m×1.00 m, for a heat exchanger power density of 67 kW/m$^2$, similar to that of the refrigerator example, although at 5.5 times lower mean pressure. The acoustic pressure amplitude is 30 kPa and the acoustic volumetric velocity amplitude is 2.388 m$^3$/s. An external fan coil unit of thermal resistance 0.040 K/kW, with a reference pressure drop of 2690 Pa at a volume flow rate of 7.3 L/s, and a round-trip 20 m loop length of nominal 1.5" pipe (ID=40.9 mm) is assumed. The secondary heat transfer fluid is again assumed to be an ethylene glycol antifreeze mixed 50% with water (properties at 325 K: density=1055 kg·m$^{-3}$, viscosity=1.7 mPa·s, heat capacity=3493 J·kg$^{-1}$·K$^{-1}$, thermal conductivity=0.426 W·m$^{-1}$·K$^{-1}$). In this case what could have been the first minimum disappears, although there is a hint of its remnant at around D=0.30 mm, where $W_{LostTOTAL}$=4909 W ($W_{LostTOTAL}/|\dot{Q}_{HX}|$=7.32%), L=2.06 mm, and M=0.265 kg/s ($M c_p/|\dot{Q}_{HX}|$=0.01381 K$^{-1}$). The only true minimum in the total lost work occurs with $W_{LostTOTAL}$=2928 W ($W_{LostTOTAL}/|\dot{Q}_{HX}|$=4.36%), at D=7.56 mm, L=3.81 mm, and M=1.134 kg/s ($M c_p/|\dot{Q}_{HX}|$=0.0590 K$^{-1}$).

It can be seen that although qualitatively similar, the optimizations of the dimensions of the ambient monocoque heat exchangers with screens for the three cases shown in FIGS. 10-15 are quantitatively different depending as they do on the design of the rest of the thermoacoustic-Stirling machines.

Figure 16:
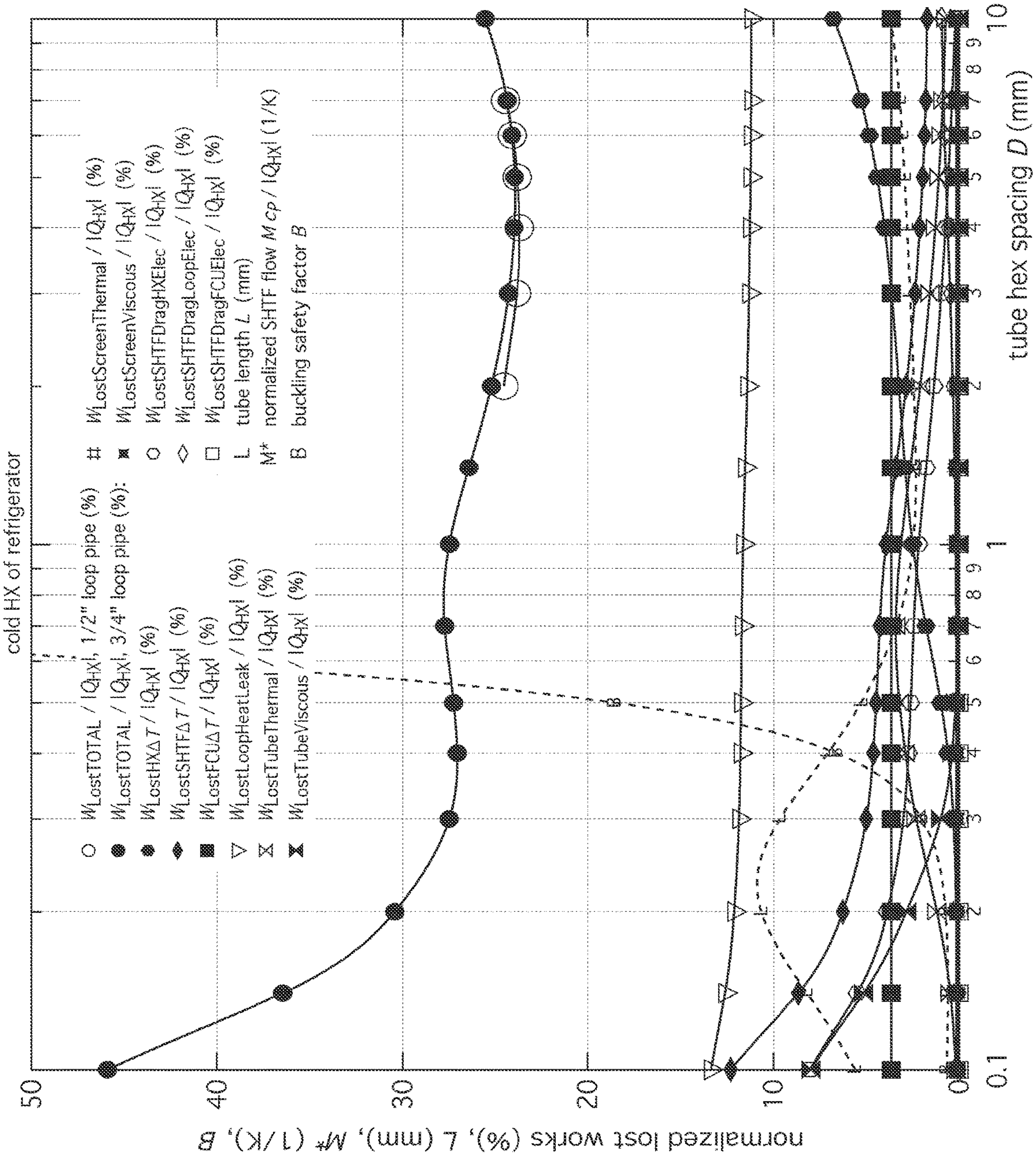
FIG. 16 is a semi-logarithmic plot of optimization results for the cold heat exchanger of a refrigerator, with mesh/screens.
Figure 17:
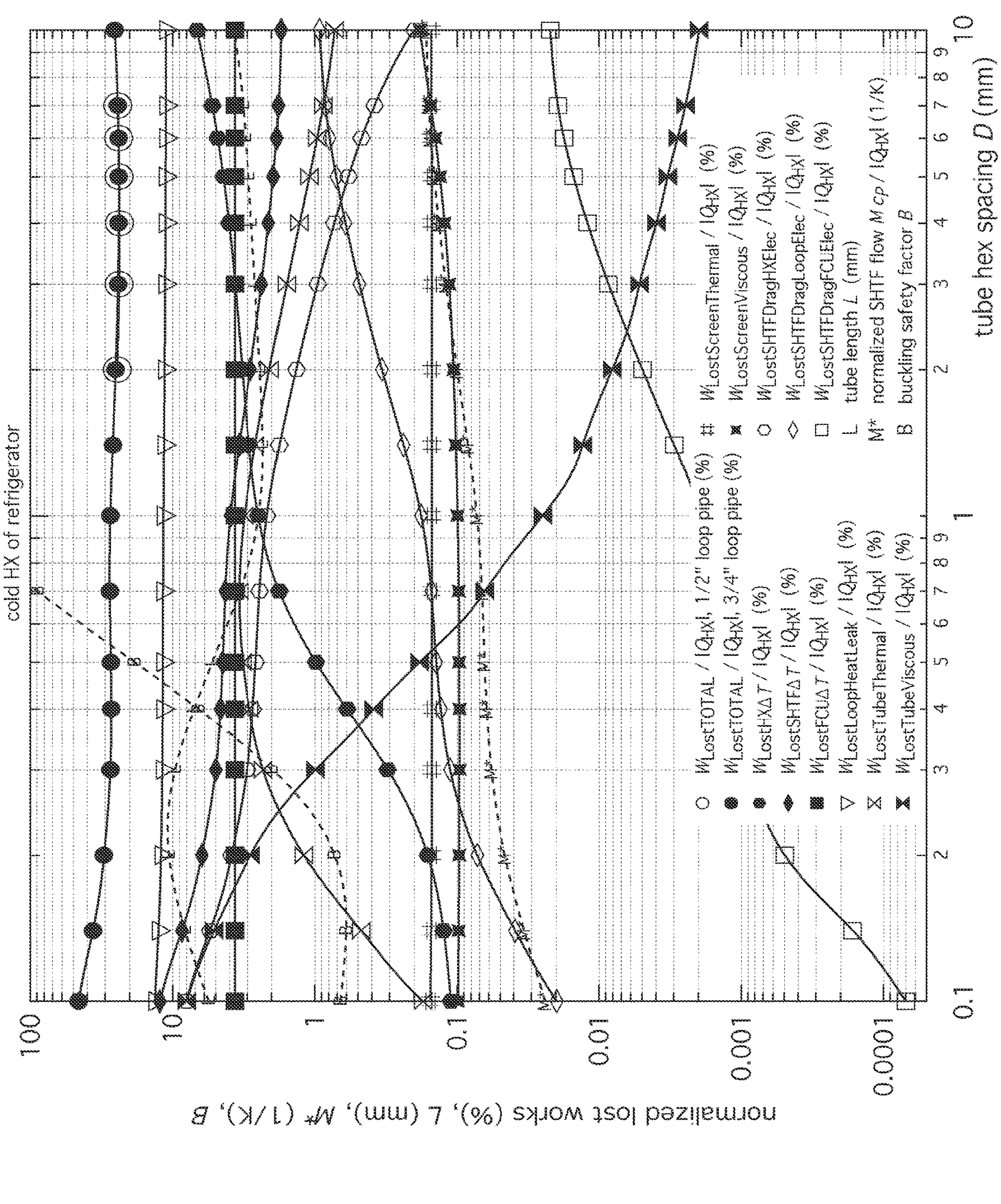
FIG. 17 is a log-log plot of optimization results for the cold heat exchanger of a refrigerator, with mesh/screens.

Turning away from these ambient heat exchangers and back to the refrigerator, FIGS. 16 and 17 show the results for the cold heat exchanger of the refrigerator described above in FIGS. 8-11. The same 100-mesh, 0.005" wire, copper screens as in FIGS. 10-13 are used on both faces of an electroless nickel tube bundle. The cold heat input per heat exchanger under consideration $\dot{Q}_{\$in}=\dot{Q}_{HX}$ is 1.2076 kW at a cold load bath temperature $T_\$$ of 248 K, and the ambient heat input per stage $\dot{Q}_{0in}$ is −1.8887 kW at an ambient bath temperature $T_0$ of 305 K, giving a $\eta_R$=2.454, as before. The heat exchanger frontal dimensions are again 178.9 mm×178.9 mm, for a heat exchanger power density of 37.7 kW/m$^2$. The acoustic pressure amplitude is 110 kPa and the acoustic volumetric velocity amplitude is 0.0304 m$^3$/s at the cold heat exchanger under consideration. As before, an external fan coil unit of thermal resistance 0.82 K/kW, with a reference pressure drop of 2690 Pa at a volume flow rate of 524 ml/s is assumed. The assumed application is for a split unit commercial food freezer, so the secondary heat transfer fluid in this case is selected to be a potassium formate based solution which is non-toxic, non-flammable, and has relatively low viscosity at freezer temperatures (TYFOXIT F40 properties at 243 K: density=1356 kg·m$^{-3}$, viscosity=13.98 mPa·s, heat capacity=2650 J·kg$^{-1}$·K$^{-1}$, thermal conductivity=0.436 W·m$^{-1}$·K$^{-1}$).

A round-trip 50 m loop length is assumed. The heat leak into a long cold loop can be important. Insulation of 6" (236 mm) OD and thermal conductivity 0.037 W·m$^{-1}$·K$^{-1}$ is assumed to surround a Schedule 40 PVC pipe of thermal conductivity 0.19 W·m$^{-1}$·K$^{-1}$. The curves and points of FIGS. 16 and 17 are for nominal ¾" pipe (26.7 mm OD, 20.9 mm ID), except for the open circles that indicate the optimized total lost work $W_{LostTOTAL}$ when using nominal ½" pipe (21.3 mm OD, 15.8 mm ID) for the loop. Whereas in the case of an ambient heat exchanger a loop pipe of larger diameter may be advantageous to keep the loop friction loss negligible and make the pipe more structurally robust, when heat leak is important the smaller pipe will have lower thermal loss at the expense of higher friction loss. The nominal ½" size is near the optimal tradeoff between thermal and friction loss for the conditions here. The second minimum in the optimized total lost work for the ¾" pipe of $W_{LostTOTAL}$=289.3 W ($W_{LostTOTAL}/|\dot{Q}_{HX}|$=24.0%), is at D=4.60 mm, L=2.88 mm, and M=0.1418 kg/s ($M c_p/|\dot{Q}_{HX}|$=0.311 K$^{-1}$), while the slightly lower second minimum of total lost work for the ½" pipe of $W_{LostTOTAL}$=286.2 W ($W_{LostTOTAL}/|\dot{Q}_{HX}|$=23.7%) is at D=4.05 mm, L=2.28 mm, and M=0.1078 kg/s ($M c_p/|\dot{Q}_{HX}|$=0.237 K$^{-1}$)—showing a dependence, but only a small dependence, of lost work and heat exchanger dimensions on the loop pipe assumptions. The higher, first minimum for the ¾" pipe of $W_{LostTOTAL}$=326.8 W ($W_{LostTOTAL}/|Q_{HX}|$=27.1%), occurs at D=0.419 mm, L=6.67 mm, and M=0.0629 kg/s ($M c_p/|\dot{Q}_{HX}|$=0.1380 K$^{-1}$).

It is interesting to note that the lost work from the heat leak $W_{LostLoopHeatLeak}$ (open inverted triangles) shows a weak dependence on tube spacing D, because at smaller D the optimization drives down the secondary heat transfer fluid mass flow rate M to compensate for the higher flow loss over a tight packing of smaller tubes, which in turn lowers the cold temperature that the refrigerator must reach to cool the external cold box at a fixed temperature $T_\$$ of 248 K, which lowers the average temperature of the secondary heat transfer fluid within the external loop pipe, and thus increases slightly the heat leak at smaller D.

Figure 20:
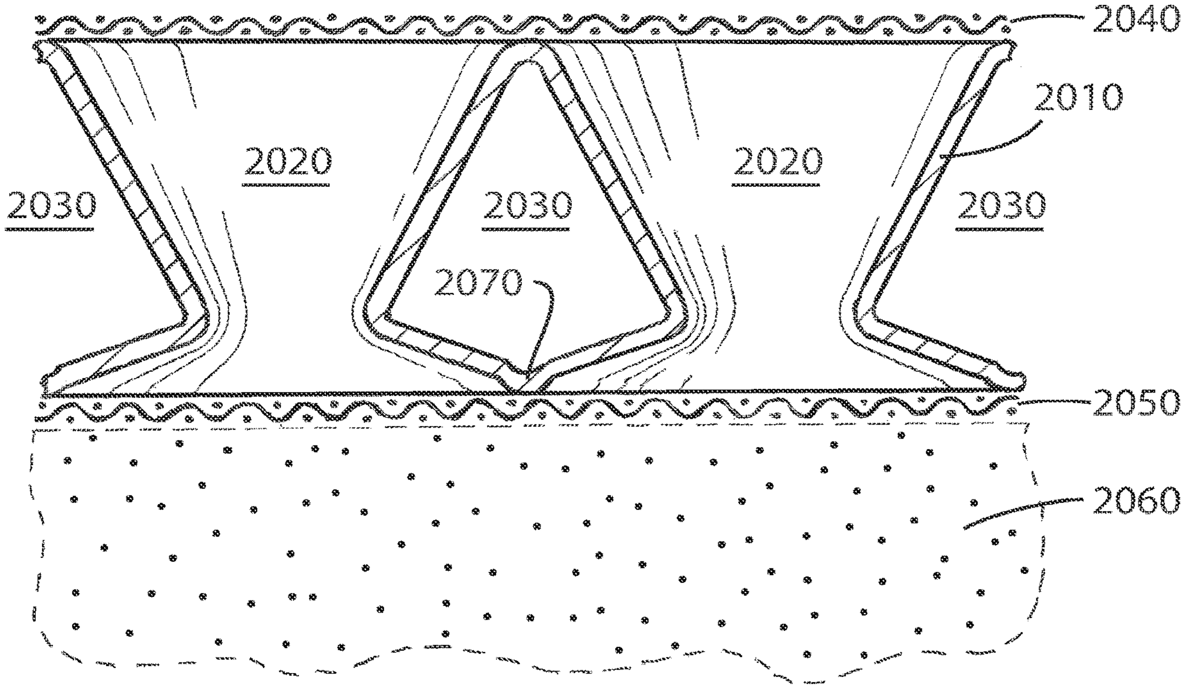
FIG. 20 is a cutaway detail of an alternative embodiment of the present invention that has the optimized dimensions of the example of FIGS. 10-11 for the ambient heat exchanger of a refrigerator with mesh/screens.

The optimizations of FIGS. 8-11 and 16-17 for the ambient and cold heat exchangers of an inline thermoacoustic-Stirling refrigerator suggest that the heat exchanger shown in FIGS. 2 and 3 could have been improved with shorter tubes. Although the heat transfer was excellent in the computational fluid dynamics calculations with 15 mm long tubes, the analytic optimizations show that the total lost work would have been less with shorter tubes. The 15 mm tubes would have had more working fluid thermo-viscous loss in the tubes than necessary for adequate heat transfer. The embodiment of FIG. 20 shows the resultant tube shape of the optimization that was shown in FIGS. 10 and 11, of the ambient heat exchanger of the refrigerator. In FIG. 20, the working fluid flows in the working fluid space 2020 inside the tubes of monocoque structure 2010, and secondary heat transfer fluid circulates around the tubes in the secondary heat transfer fluid space 2030. A mesh/screen or similar porous planar structure 2040 is joined to the monocoque structure on the face away from the regenerator 2060, and another mesh/screen or similar porous planar structure 2050 is joined to the monocoque structure on the face adjacent to the regenerator. In embodiments such as this where the tube mouth makes a shallow angle with respect to the mesh/screen 2050, it may be advantageous to add an optional raised boss 2070 to the face of the monocoque to make a well defined contact region to the mesh/screen 2050 and to allow for the free passage of working fluid in the small gap between the mesh/screen 2050 and the periphery of tube mouth.

Figure 18:
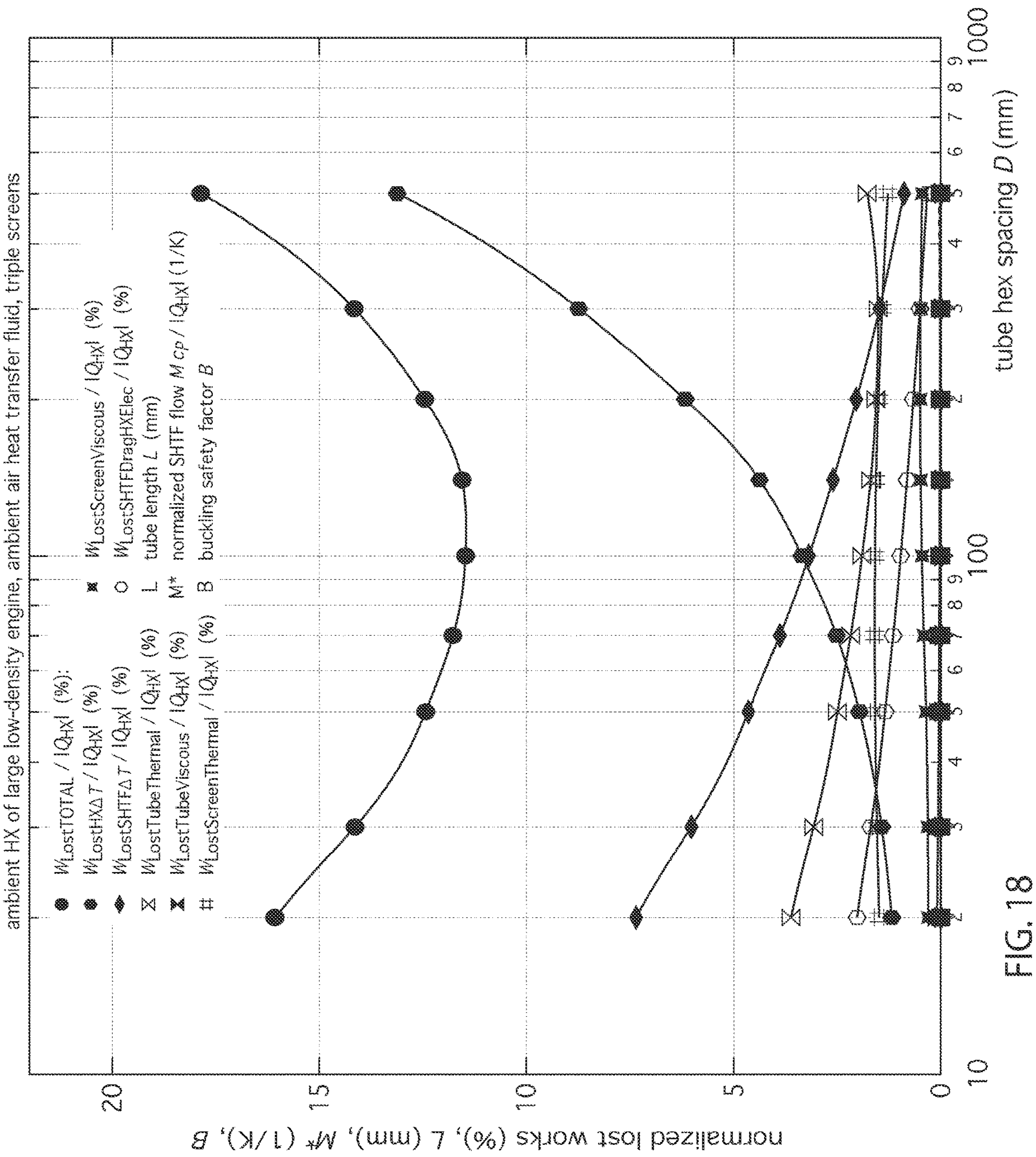
FIG. 18 is a semi-logarithmic plot of optimization results for the ambient heat exchanger of a large low-density engine with ambient air as the secondary heat transfer fluid, with triple screens as the mesh/screens.
Figure 19:
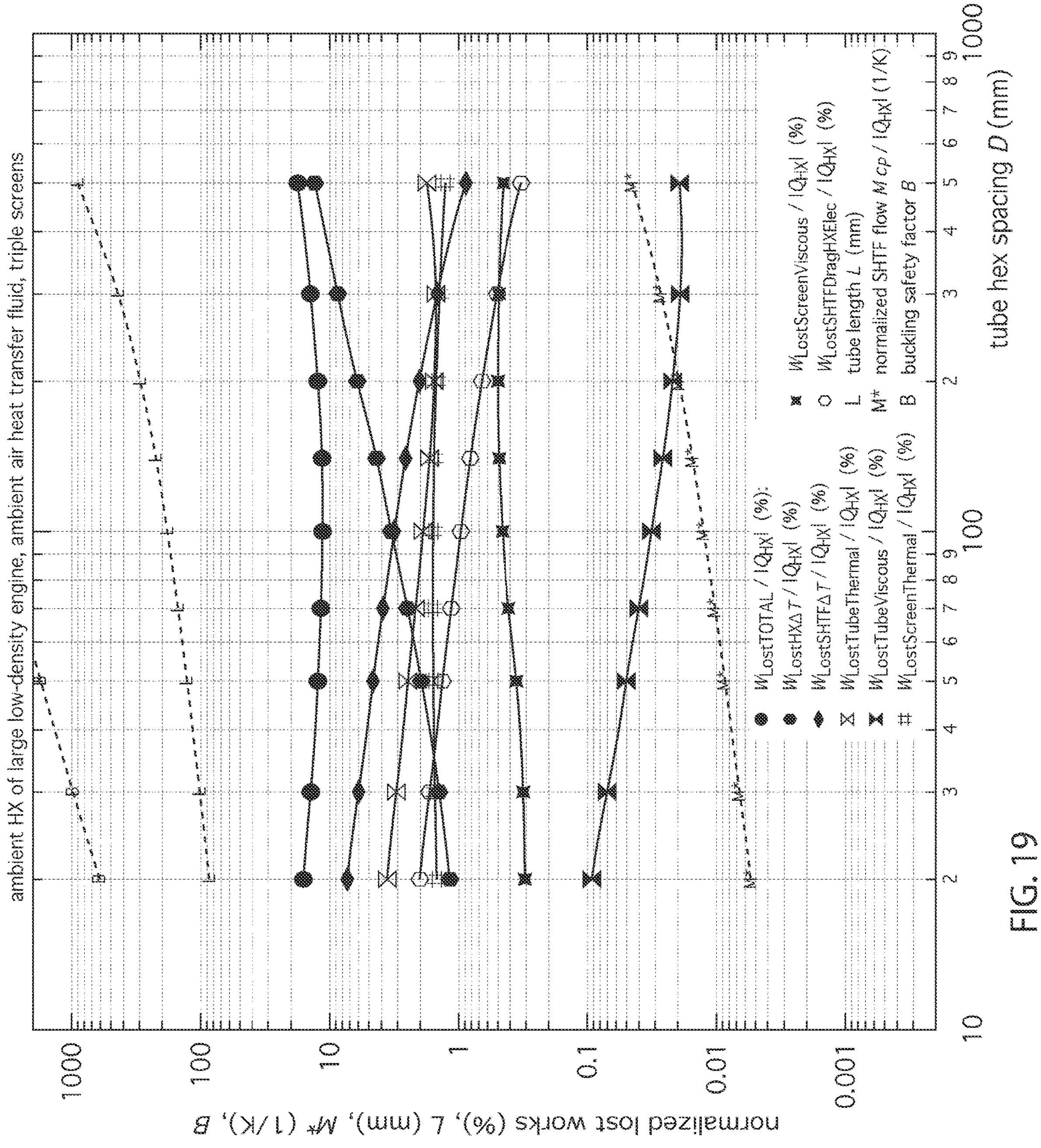
FIG. 19 is a log-log plot of optimization results for the ambient heat exchanger of a large low-density engine with ambient air as the secondary heat transfer fluid, with triple screens as the mesh/screens.

FIGS. 18 and 19 show the results for the ambient heat exchanger again for the large three-stage low-density engine in a power utility application operating at 380 Hz in a 10%-90% helium-argon mixture at 200 kPa, previously shown in FIGS. 14 and 15, but now with ambient air as the secondary heat transfer fluid (properties at 100 kPa and 300 K: density=1.1614 $kg \cdot m^{-3}$, viscosity=18.46 μPa·s, constant pressure heat capacity=1007 $J \cdot kg^{-1} \cdot K^{-1}$, thermal conductivity=0.0263 $W \cdot m^{-1} \cdot K^{-1}$). The tubes will be driven to much larger size to make room for the much lower density air compared to the liquid secondary heat transfer fluids considered earlier. This in turn drives up the lateral conduction loss in the screens that could be applied to the faces of the monocoque tube bundle. To compensate, this optimization considers the use of a fine-coarse-fine sandwich assembly of screens on each face of the monocoque tube bundle. Each screen assembly is comprised of a coarse copper square-weave screen of mesh number 4 (6.35 mm center-to-center wire spacing) of 0.063" (1.6 mm) diameter wire, joined on both sides to a fine copper square-weave screen of mesh number 100 (0.254 mm center-to-center spacing) of 0.0045" (0.114 mm) diameter wire. FIGS. 18 and 19 show that the optimization drives the monocoque tube bundle to much larger tubes of length L=197.4 mm, at spacing D=114.0 mm, with the air secondary heat transfer fluid mass flow rate M=0.907 kg/s ($M\, c_p/|\dot{Q}_{HX}|$=0.01361 $K^{-1}$), for a minimum in the total lost work $W_{LostTOTAL}$ of 7.69 kW ($W_{LostTOTAL}/|\dot{Q}_{HX}|$=11.5%).

Figure 21:
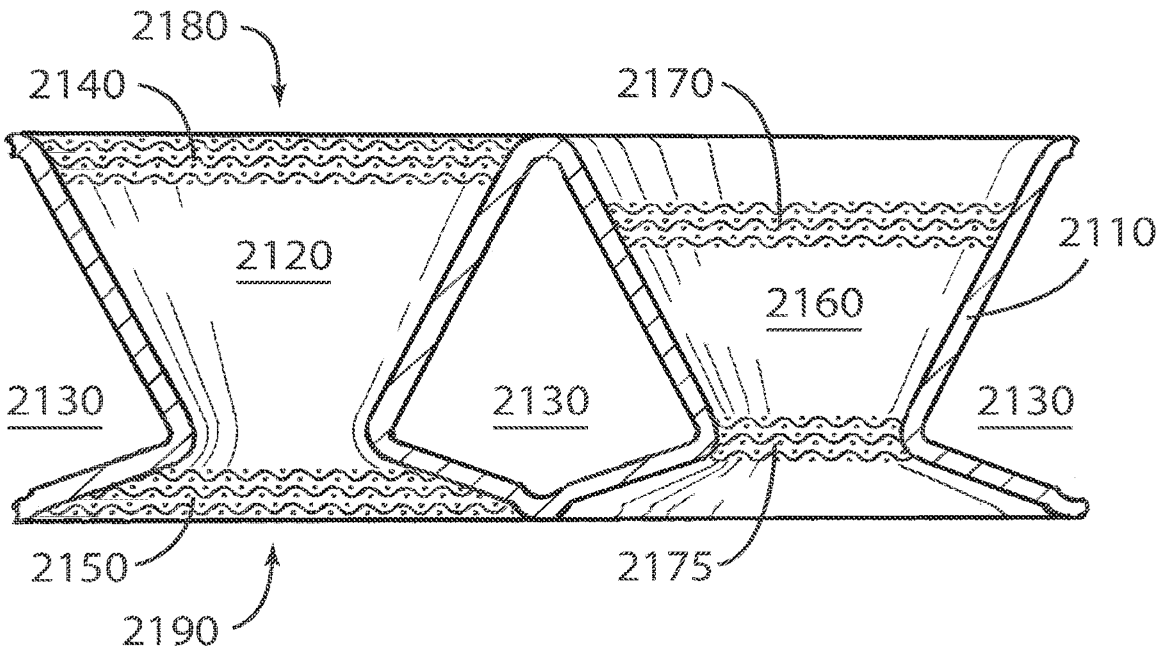
FIG. 21 is a cutaway detail of two tubes of an embodiment of a heat exchanger.
Figure 22:
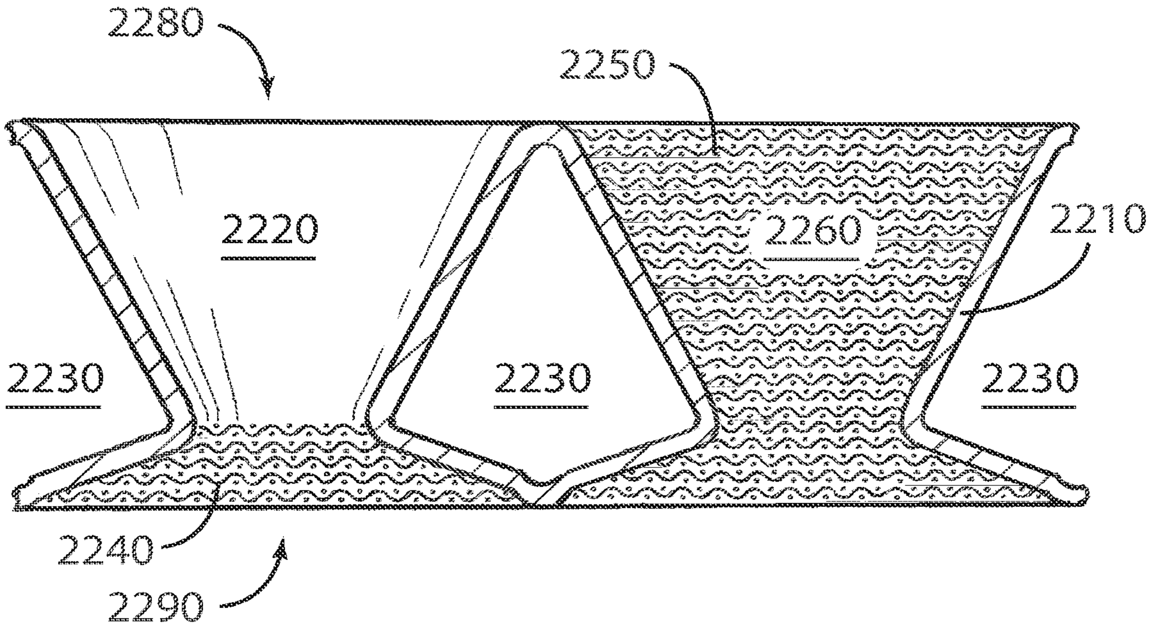
FIG. 22 is a cutaway detail of two tubes of an embodiment of a heat exchanger.

FIGS. 21 and 22 are cut away details of additional embodiments of a heat exchanger according to this disclosure. In FIG. 21, the working fluid/first fluid flows in the working fluid spaces 2120/2160 inside the tubes of monocoque structure 2110, and secondary heat transfer fluid/second fluid circulates around the tubes in the secondary heat transfer fluid space 2130. Each of the tubes has a first mouth end 2180 and an opposing second mouth end 2190. A mesh/screen or similar porous planar structure (not shown) may be joined to the monocoque structure on the first mouth end 2180 and/or the second mouth end 2190. In some embodiments, a porous packing with a pore size is disposed between the first mouth end 2180 and the second mouth end 2190. As shown, an optional porous packing 2140 is disposed in the working fluid space 2120 adjacent to the first mouth end 2180 and an optional porous packing 2150 is disposed in the working fluid space 2120 adjacent the second mouth end 2190. In some embodiments, only one porous packing (i.e. 2140 or 2150) is disposed adjacent the mouth end (i.e. first mouth end 2180 or second moth end 2190). As also shown, an optional porous packing 2170 is disposed in the working fluid space 2160 toward the first mouth end 2180 and an optional porous packing 2175 is disposed in the working fluid space 2160 toward the second mouth end 2190. In some embodiments, only one porous packing (i.e. 2170 or 2175) is disposed toward the mouth end (i.e. first mouth end 2180 or second moth end 2190). In other words, the porous packing may be disposed in the working fluid spaces at various predetermined distances from the first mouth end or the second mouth end. In some embodiments, the second mouth end 2190 is placed against or near a regenerator (not shown).

In FIG. 22, the working fluid/first fluid flows in the working fluid spaces 2220/2260 inside the tubes of monocoque structure 2210, and the secondary heat transfer fluid/second fluid circulates around the tubes in the secondary heat transfer fluid space 2230. Each of the tubes has a first mouth end 2280 and an opposing second mouth end 2290. A mesh/screen or similar porous planar structure (not shown) may be joined to the monocoque structure on the first mouth end 2280 and/or the second mouth end 2290. In some embodiments, a porous packing with a pore size is disposed between the first mouth end 2280 and the second mouth end 2290. As shown, a porous packing 2240 partially fills the working fluid space 2220 between the second mouth end 2290 and the waist region of the tube. In some embodiments, the partially filling porous packing 2240 may be disposed in the working fluid space at a predetermined distance from the first mouth end 2280 or the second mouth end 2290. A porous packing 2250 may fully fill a working fluid space 2260. In some embodiments, some working fluid spaces may be partially filled and others fully filled by the porous packing. In some embodiments, the second mouth end 2290 is placed against or near a regenerator (not shown). The embodiments according to FIGS. 21 and 22 may have a pre-determined pore size as discussed above in this disclosure. A definition of pore size is also provided below for reference.

Figure 23:
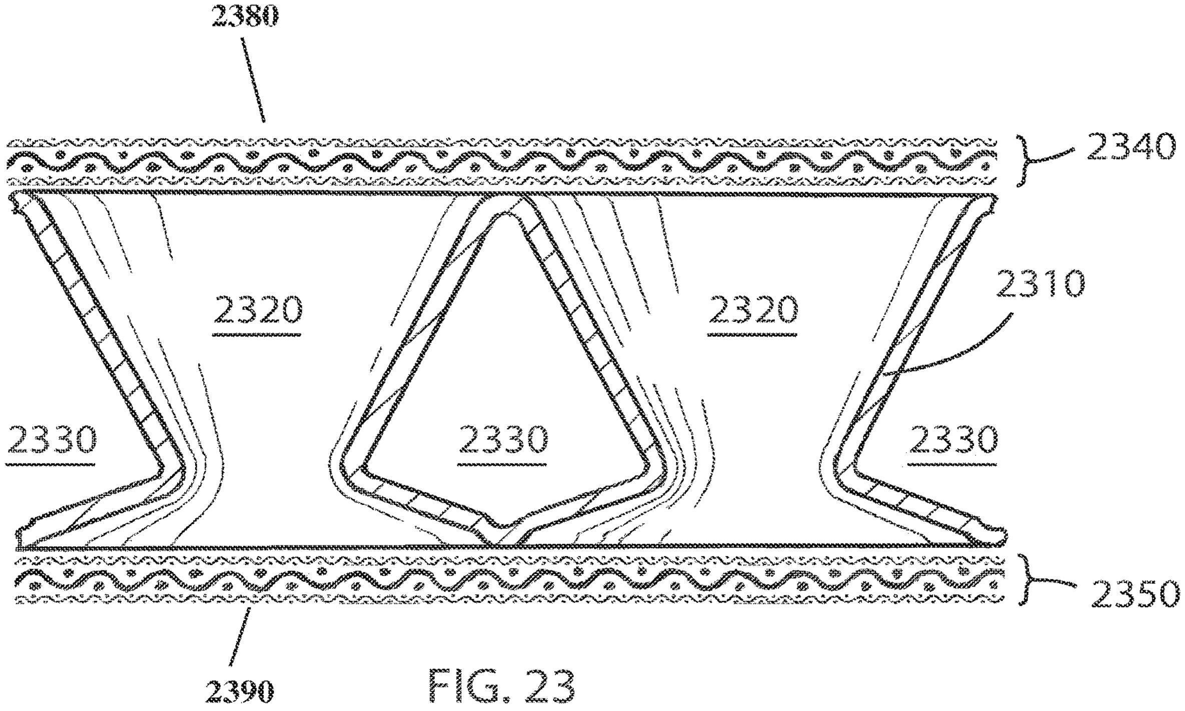
FIG. 23 is a cutaway detail of two tubes of an embodiment of a heat exchanger.

In some embodiments, the mesh/screen or similar porous planar structure joined to the first mouth end and/or the second mouth end comprise a multi-layered mesh/screen. In FIG. 23, the working fluid flows in the working fluid space 2320 inside the tubes of monocoque structure 2310, and the secondary heat transfer fluid circulates around the tubes in the secondary heat transfer fluid space 2330. Each of the tubes has a first mouth end 2380 and an opposing second mouth end 2390. A multi-layered mesh/screen or similar porous planar structure 2340 is joined to the monocoque structure on the face of the first mouth end 2380, and another multi-layered mesh/screen or similar porous planar structure 2350 is joined to the monocoque structure on the face of the second mouth end 2390. In some embodiments, the second mouth end 2390 is placed against or near a regenerator (not shown).

Definitions

Tube Waist Region: The tubes of the monocoque tube bundle are tapered at both ends of each tube portion with each tube having mouths at each end that are wider in cross section than the cross section of the tube waist region between the two mouths in the general manner of an hourglass, Venturi tube or other suitable shape. The cross section of the tubes of the monocoque bundle varies between the respective two mouths and the region that has the narrowest cross section is defined as the tube waist region.

Pore Size: The mesh/screen, porous packing, or similar porous structures have minute openings or constrictions of complicated three dimensional shape through which working fluid may pass. Pore size herein is defined by the average pore hydraulic radius, which is the volume of working fluid within the mesh/screen, porous packing, or similar porous structure, divided by the surface area of the mesh/screen, porous packing, or similar porous structure in contact with the working fluid.

Tube Local Hydraulic Radius: As a function of local position along the tube's length, the local hydraulic radius is half of the tube's local radius for circular cross-section tubes, or the local tube cross sectional area divided by the local tube perimeter for tubes of non-circular cross-section.

Thermal Penetration Depth: Thermal penetration depth, $\delta_\kappa=\sqrt{2\kappa/(\rho c_p \omega)}$, where κ is the thermal conductivity, ρ is the density, $c_p$ is the heat capacity of the working fluid at constant pressure, and ω is the angular frequency of the cycle.

The present invention has been described in the context of thermoacoustic and Stirling devices, but it may be useful in more conventional heat exchange applications where the working fluid flows in only one direction.

The foregoing detailed description has been presented for purposes of illustration and description. It is not intended to be exhaustive or to limit embodiments to the precise form disclosed. Many modifications and variations are possible in light of the above teaching. The described embodiments were chosen to explain principles and practical applications, to thereby enable others skilled in the art to utilize various embodiments and with various modifications as are suited to the particular use contemplated. As will be clear to those of skill in the art, the illustrated and discussed embodiments of the present invention may be altered in various ways without departing from the scope or teaching of the present invention. As such, this disclosure should be interpreted broadly. It is intended that the scope be defined by the claims appended hereto.

Various patents, patent applications, and/or publications have been referred to in this application. The material contained in these patents, patent applications, and/or publications is incorporated in their entirety herein by reference.

The invention claimed is:

1. A heat exchanger for transferring heat between a first fluid and a second fluid, comprising:

a heat exchanger having a monocoque structure, the heat exchanger having a first face, a second face, and a plurality of tubes in which a first fluid may oscillate in a direction, each of the plurality of tubes having a first mouth end at the first face, an opposing second mouth end at the second face, and a waist region between the first mouth end and the second mouth end;

the first mouth end, the second mouth end and the waist region of each of the plurality of tubes having a respective cross sectional area, wherein the cross sectional area of the waist region of one or more of the plurality of tubes is less than the respective cross sectional area of the first mouth end and/or the second mouth end;

one or more interconnected fluid channels through which a second fluid may flow, the one or more fluid channels lying generally in a plane between the faces of the heat exchanger, the plurality of tubes and the one or more fluid channels interleaving such that heat may be transferred between the plurality of tubes and the one or more fluid channels, wherein the direction of oscillation of the first fluid is generally perpendicular to the plane of the one or more fluid channels;

a planar mesh/screen adjoined to the first or second face of the heat exchanger so as to cover the mouth ends on the respective face of the heat exchanger, the mesh/screen providing thermal conduction to the monocoque structure, the mesh/screen having a pore size which is less than the cross sectional area of the mouth ends; and wherein the first fluid is a gas and the second fluid is a liquid.

2. The heat exchanger of claim 1, wherein the waist region of at least one of the plurality of tubes is closer to the first mouth end or the second mouth end of the at least one of the tubes.

3. The heat exchanger of claim 1, wherein:

at least two of the first mouth ends and/or of the second mouth ends of the adjacent tubes are blended together by a smooth continuous surface; and/or the cross sectional area of at least one of the first mouth ends, the second mouth ends and/or the waist regions is non-circular.

4. The heat exchanger of claim 1, further comprising a porous packing with a pore size, wherein the porous packing is disposed between the first mouth end and the second mouth end for at least some of the tubes.

5. The heat exchanger of claim 4, wherein:

the porous packing is disposed closer to the first mouth end with respect to the second mouth end or closer to the second mouth end with respect to the first mouth end of at least one of the plurality of tubes; or the porous packing fully or partially fills at least one of the plurality of tubes.

6. The heat exchanger of claim 1, wherein at least one of the plurality of tubes has a length of 15 mm or less or has a length of more than 15 mm.

7. A thermoacoustic or Stirling machine, comprising:

a first gaseous working fluid having a thermal conductivity k, a density ρ, and a heat capacity at constant pressure c;

a second fluid comprising a liquid;

a regenerator; and a heat exchanger adjacent the regenerator, the heat exchanger;

having a monocoque structure, the heat exchanger having a first face, a second face, and a plurality of tubes in which the first gaseous working fluid oscillates in a direction, the oscillation having an angular frequency of the cycle w, each of the plurality of tubes having a first mouth end at the first face, an opposing second mouth end at the second face, and a waist region between the first mouth end and the second mouth end;

the first mouth end, the second mouth end and the waist region of each of the plurality of tubes having a respective cross sectional area, wherein the cross sectional area of the waist region of one or more of the plurality of tubes is less than the respective cross sectional area of the first mouth end and/or the second mouth end;

one or more interconnected fluid channels through which the second fluid flows, the one or more fluid channels lying generally in a plane between the faces of the heat exchanger, the plurality of tubes and the one or more fluid channels interleaving such that heat is transferred between the plurality of tubes and the one or more fluid channels, wherein the direction of oscillation of the first gaseous working fluid is generally perpendicular to the plane of the one or more fluid channels;

a mesh/screen adjoined to and covering the first mouth ends or the second mouth ends at the respective face of the heat exchanger, the mesh/screen providing thermal conduction to the monocoque structure, the mesh/screen having a pore size which is less than the cross sectional area of the first mouth ends;

wherein;

the mesh/screen has pores with a hydraulic radius that is about or smaller than a thermal penetration depth of the first gaseous working fluid;

the thermal penetration depth is defined as $\delta_k = \sqrt{2K/(\rho c_p \omega)}$; and the pore hydraulic radius is defined as a first fluid volume within the pores divided by a surface area of the pores in contact with the first gaseous working fluid.

8. The thermoacoustic or Stirling machine of claim 7, wherein the mesh/screen comprises a planar mesh/screen adjoined to the respective face of the heat exchanger so as to cover the mouth ends.

9. The thermoacoustic or Stirling machine of claim 7, wherein the waist region of at least one of the plurality of tubes is closer to the first mouth end or the second mouth end of the at least one of the tubes.

10. The thermoacoustic or Stirling machine of claim 7, wherein:

at least two of the first mouth ends and/or of the second mouth ends of the adjacent tubes are blended together by a smooth continuous surface; and/or the cross sectional area of at least one of the first mouth ends, the second mouth ends and/or the waist regions is non-circular.

11. The thermoacoustic or Stirling machine of claim 7, further comprising a porous packing with a pore size, wherein the porous packing is disposed between the first mouth end and the second mouth end for at least some of the tubes.

12. The thermoacoustic or Stirling machine of claim 11, wherein:

the porous packing is disposed closer to the first mouth end with respect to the second mouth end or closer to the second mouth end with respect to the first mouth end of at least one of the plurality of tubes; or the porous packing fully or partially fills at least one of the plurality of tubes.

13. The thermoacoustic or Stirling machine of claim 7, wherein at least one of the plurality of tubes has a length of 15 mm or less or has a length of more than 15 mm.

14. A heat exchanger system, comprising:

a first gaseous working fluid having a thermal conductivity k, a density ρ, and a heat capacity at constant pressure $c_p$;

a second fluid comprising a liquid;

a heat exchanger having a monocoque structure, the heat exchanger having a first face, a second face, and a plurality of tubes in which the first gaseous working fluid oscillates in a direction, the oscillation having an angular frequency of the cycle w, each of the plurality of tubes having a first mouth end at the first face, an opposing second mouth end at the second face, and a waist region between the first mouth end and the second mouth end;

the first mouth end, the second mouth end and the waist region of each of the plurality of tubes having a respective cross sectional area, wherein the cross sectional area of the waist region of one or more of the plurality of tubes is less than the respective cross sectional area of the first mouth end and/or the second mouth end;

one or more interconnected fluid channels through which the second fluid flows, the one or more fluid channels lying generally in a plane between the faces of the heat exchanger, the plurality of tubes and the one or more fluid channels interleaving such that heat is transferred between the plurality of tubes and the one or more fluid channels, wherein the direction of oscillation of the first gaseous working fluid is generally perpendicular to the plane of the one or more fluid channels;

a mesh/screen adjoined to and covering the first mouth ends or the second mouth ends at the respective face of the heat exchanger, the mesh/screen providing thermal conduction to the monocoque structure, the mesh/screen having a pore size which is less than the cross sectional area of the first mouth ends;

wherein;

the mesh/screen has pores with a hydraulic radius on the order of or smaller than a thermal penetration depth of the first gaseous working fluid;

the thermal penetration depth is defined as $\delta_k = \sqrt{2K/(\rho c_p \omega)}$; and the pore hydraulic radius is defined as a first fluid volume within the pores divided by a surface area of the pores in contact with the first gaseous working fluid.

15. The heat exchanger system of claim 14, wherein the mesh/screen comprises:

a multi-layered mesh/screen; and/or a planar mesh/screen structure covering a plurality of the first or second mouth ends.

16. The heat exchanger system of claim 14, further comprising a second mesh/screen adjoined to and covering the other of the first or second mouth ends at the other face of the heat exchanger.

17. The heat exchanger system of claim 14, wherein the mesh/screen comprises a planar mesh/screen adjoined to the respective face of the heat exchanger so as to cover the mouth ends.

18. The heat exchanger system of claim 14, wherein the waist region of at least one of the plurality of tubes is closer to the first mouth end or the second mouth end of the at least one of the tubes.

19. The heat exchanger system of claim 14, wherein:

at least two of the first mouth ends and/or of the second mouth ends of the adjacent tubes are blended together by a smooth continuous surface; and/or the cross sectional area of at least one of the first mouth ends, the second mouth ends and/or the waist regions is non-circular.

20. The heat exchanger system of claim 14, further comprising a porous packing with a pore size, wherein the porous packing is disposed between the first mouth end and the second mouth end for at least some of the tubes.

21. The heat exchanger system of claim 20, wherein:

the porous packing is disposed closer to the first mouth end with respect to the second mouth end or closer to the second mouth end with respect to the first mouth end of at least one of the plurality of tubes; or the porous packing fully or partially fills at least one of the plurality of tubes.

22. The heat exchanger system of claim 14, wherein at least one of the plurality of tubes has a length of 15 mm or less or has a length of more than 15 mm.

* * * * *